(12) United States Patent
Sakai et al.

(10) Patent No.: US 9,417,956 B2
(45) Date of Patent: Aug. 16, 2016

(54) ERROR DETECTION AND CORRECTION UNIT, ERROR DETECTION AND CORRECTION METHOD, INFORMATION PROCESSOR, AND PROGRAM

(71) Applicant: Sony Corporation, Tokyo (JP)

(72) Inventors: Lui Sakai, Kanagawa (JP); Ryoji Ikegaya, Kanagawa (JP); Tatsuo Shinbashi, Tokyo (JP); Kenichi Nakanishi, Tokyo (JP); Yasushi Fujinami, Tokyo (JP); Makiko Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 14/154,918

(22) Filed: Jan. 14, 2014

(65) Prior Publication Data

US 2014/0223256 A1    Aug. 7, 2014

(30) Foreign Application Priority Data

Feb. 5, 2013    (JP) ................................ 2013-020055

(51) Int. Cl.
*H03M 13/00*    (2006.01)
*G06F 11/10*    (2006.01)

(52) U.S. Cl.
CPC .................................. *G06F 11/1012* (2013.01)

(58) Field of Classification Search
CPC ........... G06F 11/1012; G11B 20/1833; H03M 13/2909; H04L 1/0041; H04L 1/005; H04L 1/0057
See application file for complete search history.

(56) References Cited

U.S. PATENT DOCUMENTS

| | | | | |
|---|---|---|---|---|
| 7,012,974 | B1 * | 3/2006 | Liu | .................... H04L 25/03337 375/340 |
| 2009/0172481 | A1 * | 7/2009 | Cornwell | ............ G06F 11/1068 714/721 |
| 2011/0138247 | A1 * | 6/2011 | Limberg | ............... H04L 1/0041 714/751 |

FOREIGN PATENT DOCUMENTS

JP    2010-287305    12/2010

* cited by examiner

*Primary Examiner* — Guy Lamarre
(74) *Attorney, Agent, or Firm* — Chip Law Group

(57) ABSTRACT

An error detection and correction unit includes: a first-code error detection section configured to detect whether or not each of a plurality of first code words in a second code word has an error, the second code word generated by encoding the plurality of first code words in chains and being a code word containing a plurality of partial data; and a second-code error correction section configured to correct the error in one partial data containing the first code word in which the error is detected of the plurality of partial data in the second code word, based on adjacent partial data adjacent to the one partial data.

15 Claims, 41 Drawing Sheets

REGULAR
CHECK MATRIX
Hreg#i=
$$\begin{bmatrix} & & & \vdots & & & & \\ \cdots & 1 & 1 & 1 & 1 & \cdots & 1 & \cdots \\ & & & 1 & & & & \\ & & & 1 & & & & \\ & & & \vdots & & & & \end{bmatrix}$$

FIG. 6A

REGULAR
CHECK MATRIX
Hreg#1=
$$\begin{bmatrix} 1 & 1 & 1 & 0 & 0 & 0 & 1 & 0 & 1 & 0 & 0 \\ 1 & 1 & 0 & 1 & 1 & 0 & 0 & 0 & 0 & 1 & 1 \\ 0 & 0 & 1 & 1 & 1 & 1 & 0 & 0 & 1 & 0 & 0 \\ 0 & 0 & 0 & 1 & 1 & 0 & 1 & 1 & 0 & 0 & 1 \\ 1 & 1 & 0 & 0 & 0 & 1 & 0 & 1 & 0 & 1 & 0 \\ 0 & 0 & 1 & 0 & 0 & 0 & 1 & 1 & 1 & 0 & 1 \end{bmatrix}$$
$H_U$#1
$H_L$#1

FIG. 6B

ERROR DETECTION AND CORRECTION UNIT, ERROR DETECTION AND CORRECTION METHOD, INFORMATION PROCESSOR, AND PROGRAM

CROSS REFERENCE TO RELATED APPLICATIONS

This application claims the benefit of Japanese Priority Patent Application JP 2013-020055 filed Feb. 5, 2013, the entire contents which are incorporated herein by reference.

BACKGROUND

The present technology relates to an error detection and correction unit, an error detection and correction method, an information processor, and a program allowing, when executed by a computer, the computer to implement an error detection and correction method in the error detection and correction unit. More specifically, the present technology relates to an error detection and correction unit, an error detection and correction method, and an information processor each of which uses a plurality of kinds of encoding systems, and a program allowing, when executed by a computer, the computer to implement an error detection and correction method in the error detection and correction unit.

When data stored in a data recording and reproduction unit such as a magneto-optical recording disk, a hard disk, and a non-volatile memory is reproduced, the stored data may be corrupted and may not be read correctly, due to damage to the data recoding and reproduction unit, thermal noise, and the like. To deal with such data corruption, a typical data recording unit encodes data that is to be stored into an error detection and correction code (ECC), and holds the ECC. When the data is reproduced, the data recoding unit is allowed to detect and correct an error in the data with use of the ECC.

In encoding, a plurality of encoding systems may be used to improve error correction capability. For example, there is proposed a non-volatile memory that encodes a plurality of data into block code words, encodes these respective block code words into respective convolution code words, and then holds the convolution code words (for example, refer to Japanese Unexamined Patent Application Publication No. 2010-287305). In a case where the non-volatile memory has performed error correction to each of the block code words, and the error correction to one of the block code words has failed, the non-volatile memory reliably corrects an error in the data by decoding the convolution code word containing the block code word to which the error correction has failed.

SUMMARY

In the above-described technique, it may take a long time to correct an error in data. In the above-described non-volatile memory, a sequence in which a plurality of block code words are interleaved is convolutionally encoded as a target for encoding. Since the thus-interleaved sequence is convolutionally encoded, it is necessary to decode all convolution code words before decoding one block code word. Therefore, in the above-described non-volatile memory, to reliably correct data, even if correction to one block code word has failed, it is necessary to correct all convolution code words. Accordingly, it takes a long time to correct the error in the data, and it is difficult to accurately correct the error in the data at high speed.

It is desirable to accurately correct an error in data at high speed.

According to an embodiment of the present technology, there is provided an error detection and correction unit including: a first-code error detection section configured to detect whether or not each of a plurality of first code words in a second code word has an error, the second code word generated by encoding the plurality of first code words in chains and being a code word containing a plurality of partial data; and a second-code error correction section configured to correct the error in one partial data containing the first code word in which the error is detected of the plurality of partial data in the second code word, based on adjacent partial data adjacent to the one partial data.

According to an embodiment of the present technology, there is provided an error detection and correction method including: detecting whether or not each of a plurality of first code words in a second code word has an error, the second code word generated by encoding the plurality of first code words in chains and being a code word containing a plurality of partial data; and correcting the error in one partial data containing the first code word in which the error is detected of the plurality of partial data in the second code word, based on adjacent partial data adjacent to the one partial data.

According to an embodiment of the present technology, there is provided a non-transitory tangible recording medium having a program embodied therein, the computer-readable program allowing, when executed by a computer, the computer to implement a method, the method including: detecting whether or not each of a plurality of first code words in a second code word has an error, the second code word generated by encoding the plurality of first code words in chains and being a code word containing a plurality of partial data; and correcting the error in one partial data containing the first code word in which the error is detected of the plurality of partial data in the second code word, based on adjacent partial data adjacent to the one partial data.

Thus, an effect is achieved that the error is corrected, based on the adjacent partial data.

Moreover, in the error detection and correction unit according to the embodiment of the present technology, a data part common to partial data adjacent to each other of the plurality of partial data may be a common code word, and the second-code error correction section may correct the error in the one partial data containing the first code word in which the error is detected, based on the data part common to the one partial data and the adjacent partial data. Thus, an effect is achieved that the error is corrected, based on the data part common to the partial data adjacent to each other.

Further, in the error detection and correction unit according to the embodiment of the present technology, the second-code error correction section may correct an error in the adjacent partial data, and when error correction to the adjacent partial data is successful, the second-code error correction section may correct the error detected by the first-code error detection section, based on the adjacent partial data. Thus, an effect is achieved that, when error correction to the adjacent partial data is successful, the error is corrected, based on the adjacent partial data.

Furthermore, in the error detection and correction unit according to the embodiment of the present technology, when error correction to the adjacent partial data has failed, the second-code error correction section may correct an error in new adjacent partial data that is partial data adjacent to the adjacent partial data, and may determine whether or not error correction to the new adjacent partial data is successful. Thus, an effect is achieved that, in a case where error correction to the adjacent partial data has failed, partial data adjacent to the adjacent partial data is used as the new adjacent partial data.

In the error detection and correction unit according to the embodiment of the present technology, when an error in the first code word contained in the adjacent partial data is not detected, the second-code error correction section may correct the error detected by the first-code error detection section, based on the adjacent partial data, and when an error in the first code word contained in the adjacent partial data is detected, the second-code error correction section may determine whether or not an error is detected in the first code word contained in new adjacent partial data that is partial data adjacent to the adjacent partial data. Thus, an effect is achieved that, in a case where the error is detected in the first code word contained in the adjacent partial data, partial data adjacent to the adjacent partial data is used as the new adjacent partial data.

In the error detection and correction unit according to the embodiment of the present technology, the second-code error correction section may correct an error in the second code word when error correction to the adjacent partial data has failed. Thus, an effect is achieved that, in a case where error correction to the adjacent partial data has failed, the error in the second code word is corrected.

In the error detection and correction unit according to the embodiment of the present technology, the second-code error correction section may determine whether or not correction to the error that is performed, based on the adjacent partial data, is successful, and when the correction has failed, the second-code error correction section may correct the error, based on third code words each containing the first code word. Thus, an effect is achieved that, in a case where error correction that is performed, based on the adjacent partial data, has failed, the error is corrected, based on the third code words each containing the first code word.

In the error detection and correction unit according to the embodiment of the present technology, the second code word may be a convolution code word, and the second-code error correction section may correct the error, based on a result of a convolution operation performed on the adjacent partial data. Thus, an effect is achieved that the error is corrected, based on the result of the convolution operation performed on the adjacent partial data.

In the error detection and correction unit according to the embodiment of the present technology, the second code word may be a turbo code word. Thus, an effect is achieved that the error is corrected in the turbo code word.

In the error detection and correction unit according to the embodiment of the present technology, the second-code error correction section may correct the error in a combination of the one partial data containing the first code word in which the error is detected and the adjacent partial data as one decoding unit. Thus, an effect is achieved that the error in the combination of the one partial data containing the first code word in which the error is detected and the adjacent partial data as one decoding unit is corrected.

In the error detection and correction unit according to the embodiment of the present technology, each of the plurality of partial data may contain a second parity used to correct an error in each of the partial data and a first parity used to correct an error in the second parity, and the second-code error correction section may correct the error in the second parity with use of the first parity, and may correct the error in the one partial data with use of the corrected second parity. Thus, an effect is achieved that the error in the partial data is corrected with use of the second parity that is corrected with use of the first parity.

In the error detection and correction unit according to the embodiment of the present technology, each of the plurality of partial data may contain two or more of the plurality of first code words. Thus, an effect is achieved that an error in the partial data containing the plurality of block code words is corrected.

According to an embodiment of the present technology, there is provided an information processor including: a second-code encoding section configured to generate a second code word by encoding a plurality of first code words in chains, the second code word being a code word containing a plurality of partial data; a first-code error detection section configured to detect whether or not each of the first code words in the second code word has an error; and a second-code error correction section configured to correct the error in one partial data containing the first code word in which the error is detected of the plurality of partial data in the second code word, based on adjacent partial data adjacent to the one partial data. Thus, an effect is achieved that the error is corrected, based on the adjacent partial data.

In the embodiment of the present technology, the error detection and correction unit is allowed to achieve a superior effect that data is allowed to be accurately corrected at high speed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

FIGS. 6A and 6B are diagrams illustrating an example of a regular check matrix according to the first embodiment.

DETAILED DESCRIPTION

Some embodiments of the present technology will be described below. Description will be given in the following order.

1. First Embodiment (An example in which error correction is performed, based on adjacent partial data)

2. Second Embodiment (An example in which error correction is performed, based on adjacent partial data traced back until correction is successful)

3. Third Embodiment (An example in which a convolution code word is used as a second code word, and error correction is performed, based on adjacent partial data)

4. Fourth Embodiment (An example in which a turbo code word is used as the second code word, and error correction is performed, based on adjacent partial data)

5. Fifth Embodiment (An example in which error correction is performed, based on parity corrected in adjacent partial data)

6. Sixth Embodiment (An example in which error correction is performed, based on a third code word when error correction performed based on adjacent partial data has failed)

1. First Embodiment

Configuration Example of Information Processing System

Figure 1:
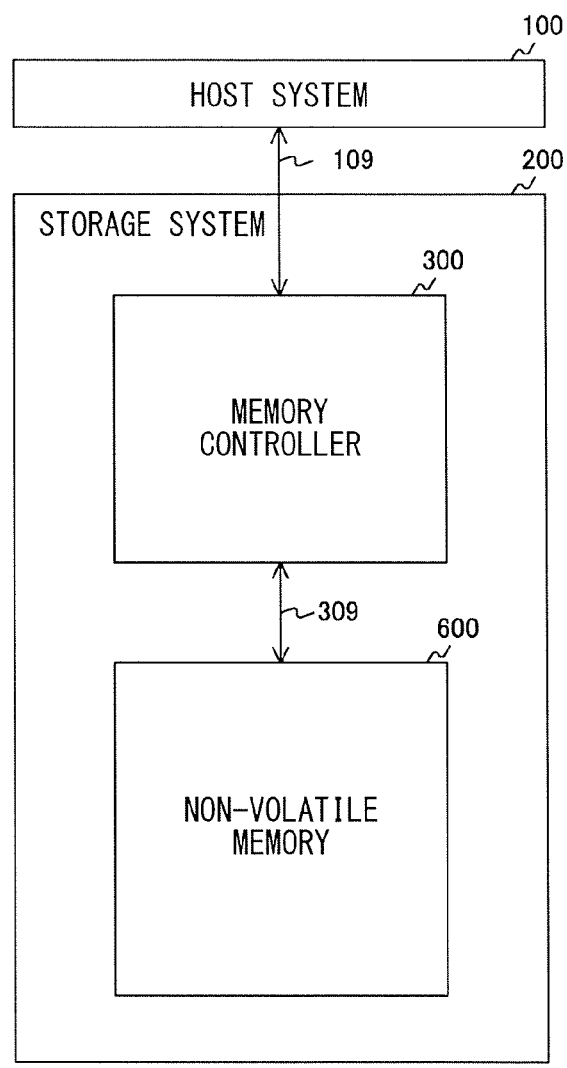
FIG. 1 is a block diagram illustrating a configuration example of an information processing system according to a first embodiment.

FIG. 1 is a block diagram illustrating a configuration example of an information processing system according to a first embodiment. The information processing system includes a host system 100 and a storage system 200.

The host system 100 is configured to control the entire information processing system. More specifically, the host system 100 generates commands and data, and supplies the commands and the data to the storage system 200 through a signal line 109. Moreover, the host system 100 receives data from the storage system 200. The commands may be used to control the storage system 200, and examples of the commands may include a write command for data writing, and a read command for data reading.

The storage system 200 includes a memory controller 300 and a non-volatile memory 600. The memory controller 300 is configured to control the non-volatile memory 600. When the memory controller 300 receives the write command and write data from the host system 100, the memory controller 300 generates an error detection and correction code (ECC) from the write data. More specifically, the memory controller 300 converts (i.e., encodes) the write data into an ECC containing the write data and a parity. The memory controller 300 accesses the non-volatile memory 600 through a signal line 309 to write the encoded data to the non-volatile memory 600.

Moreover, when the memory controller 300 receives the read command from the host system 100, the memory controller 300 accesses the non-volatile memory 600 through the signal line 309 to read the encoded data. Then, the memory controller 300 converts (i.e., decodes) the encoded data into original data before encoded. In this decoding, the memory controller 300 detects and corrects an error in data, based on the ECC. The memory controller 300 supplies corrected data to the host system 100.

The non-volatile memory 600 is configured to hold data, based on control by the memory controller 300.

Configuration Example of Memory Controller

Figure 2:
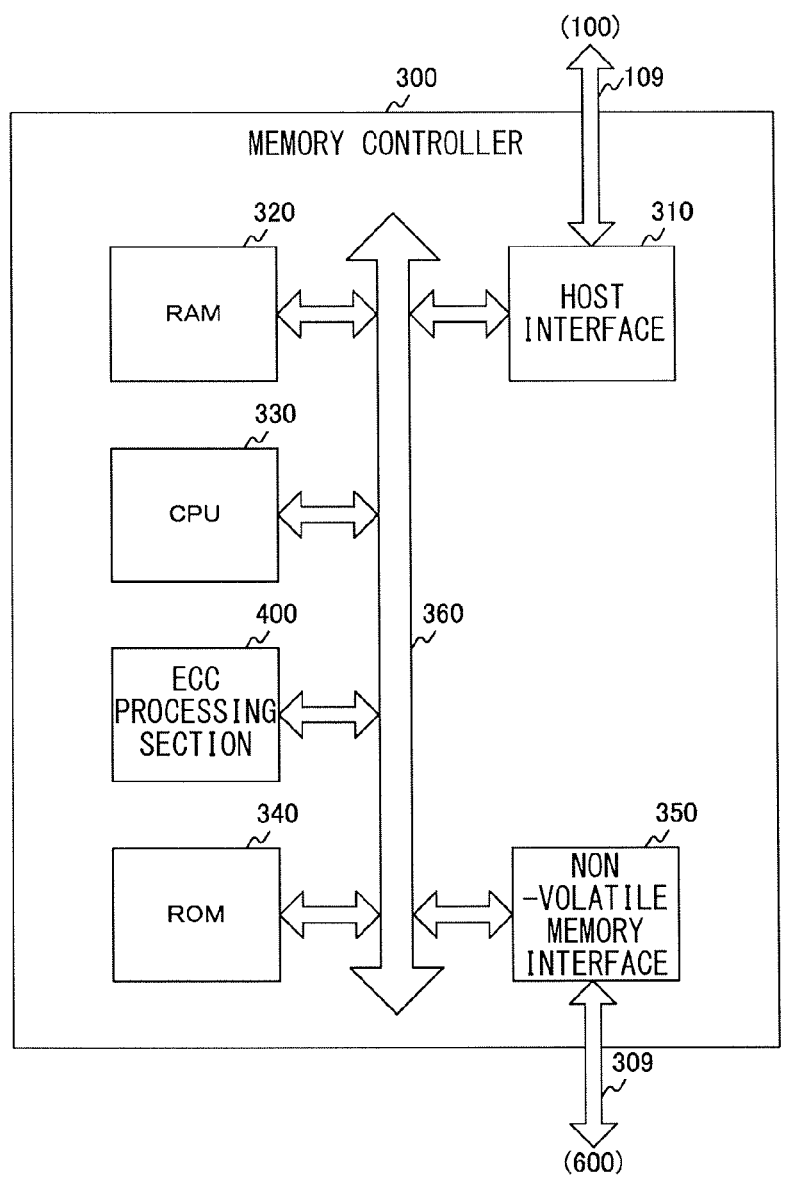
FIG. 2 is a block diagram illustrating a configuration example of a memory controller according to the first embodiment.

FIG. 2 is a block diagram illustrating a configuration example of the memory controller 300 according to the first embodiment. The memory controller 300 includes a host interface 310, a RAM (Random Access Memory) 320, a CPU (Central Processing Unit) 330, a ROM (Read Only Memory) 340, a non-volatile memory interface 350, and a bus 360. The memory controller 300 further includes an ECC processing section 400.

The host interface 310 is configured to mutually exchange data and commands with the host system 100. The RAM 320 is configured to temporarily hold necessary data in processing that is to be executed by the CPU 330. The CPU 330 is configured to control the entire memory controller 300. The ROM 340 is configured to hold a program or the like that is to be executed by the CPU 330. The non-volatile memory interface 350 is configured to mutually exchange data and commands with the non-volatile memory 600. The bus 360 is a common path for mutually exchanging data between the host interface 310, the RAM 320, the CPU 330, the ROM 340, the non-volatile memory interface 350, and the ECC processing section 400.

The ECC processing section 400 is configured to encode write data and to decode read data. In encoding of write data, the ECC processing section 400 encodes a plurality of write data as target data for block-code encoding into block codes on a predetermined unit basis by adding a parity to each of the target data for block-code encoding. Hereinafter, each of data encoded into a block code on the predetermined unit basis is referred to as "first code word". Then, the ECC processing section 400 encodes each of the first code words in chains on a predetermined unit basis. Hereinafter, the data encoded in chains is referred to as "second code word". It is to be noted that the ECC processing section 400 corresponds to a specific example of "error error detection and correction unit" in an embodiment of the present technology.

"Encoding in chains" means that a plurality of data are sequentially encoded in fixed order by encoding with use of a state obtained from data previous to data that is encoded at present and the data that is encoded at present. The order of encoding is determined by the time when data is received or generated, a value of an address where data is recoded, and the like. Moreover, the second code word contains the first code words and parities that are used to detect and correct an error in the second code word. In other words, the ECC generated by the ECC processing section 400 contains the first code word and the second code word. Hereinafter, a parity used to check the first code word is referred to as "first parity", and a parity used to check the second code word is referred to as "second parity".

The ECC processing section 400 supplies the encoded write data to the non-volatile memory 600 through the bus 360.

When encoded read data is read, the ECC processing section 400 detects and corrects an error in the first code word with use of the first parity. In a case where error correction to the first code word has failed, the ECC processing section 400 corrects the second code word with use of the second parity to correct the error in the first code word to which the error correction has failed. The ECC processing section 400 supplies the corrected first code word to the host system 100 through the bus 360.

Configuration Example of ECC Processing Section

Figure 3:
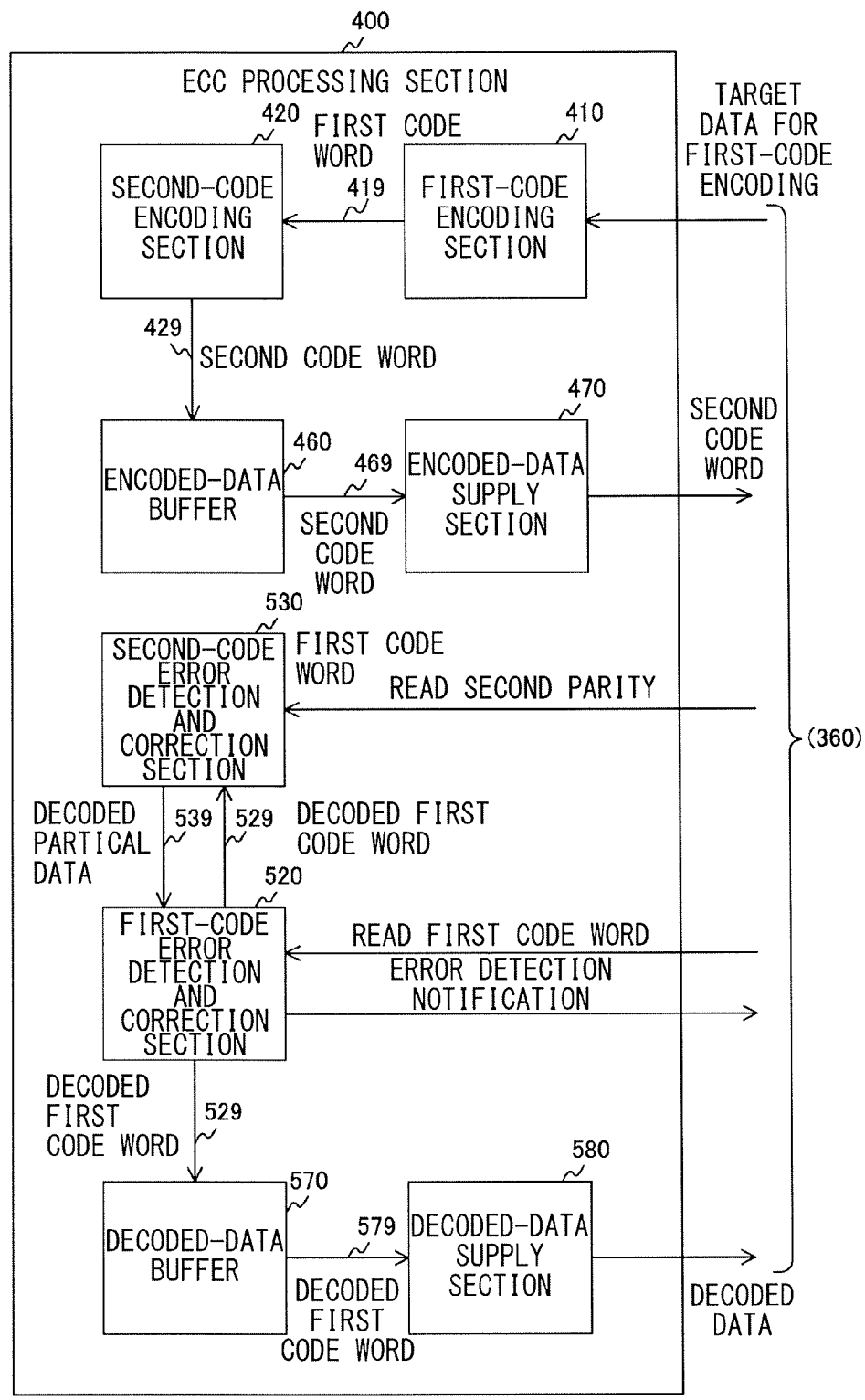
FIG. 3 is a block diagram illustrating a configuration example of an ECC processing section according to the first embodiment.

FIG. 3 is a block diagram illustrating a configuration example of the ECC processing section 400 according to the first embodiment. The ECC processing section 400 includes a first-code encoding section 410, a second-code encoding section 420, an encoded-data buffer 460, and an encoded-data supply section 470. The ECC processing section 400 further includes a first-code error detection and correction section 520, a second-code error detection and correction section 530, a decoded-data buffer 570, and a decoded-data supply section 580.

The first-code encoding section 410 is configured to encode a plurality of write data as target data for first-code encoding into the first code words. In this first-code encoding, for example, a binary BCH (Bose Chaudhuri Hocquenghem) code may be used as a first code. The first-code encoding section 410 supplies the first code words generated by the encoding to the second-code encoding section 420 through a signal line 419.

It is to be noted that the first-code encoding section 410 uses, as the first code, the BCH code that is capable of detecting and correcting an error; however, the first code is not limited to the BCH code, and may be any code having error detection capability. Examples of the first code include a code containing a parity bit that does not have error correction capability, a hamming code, and an RS (Reed-Solomon) code. Moreover, the first-code encoding section 410 may use, as the first code, a higher-than-binary code.

The second-code encoding section 420 is configured to encode the first code word into the second code word. More specifically, the second-code encoding section 420 encodes a plurality of first code words into the second code word by a spatially-coupled LDPC encoding system. In decoding, an error in a whole or a part of the second code word is corrected. Hereinafter, each of parts that are partially decoded of the second code word is referred to as "partial data".

The encoded-data buffer 460 is configured to hold data encoded into the second code word. The encoded-data supply section 470 is configured to read the second code word from the encoded-data buffer 460, and to supply the second code word to the bus 360.

The first-code error detection and correction section 520 is configured to detect and correct an error in the first code word. The first-code error detection and correction section 520 may correct the error with use of, for example, a hard-decision decoding method in which a value of each symbol of the first code word is uniquely determined to be "1" or "0". The symbol is a minimum unit configuring a code word, and may be, for example, 1 bit. The first-code error detection and correction section 520 decodes the first code word, and the first-code error detection and correction section 520 outputs the decoded first code word to the second-code error detection and correction section 530, and stores the decoded first code word in the decoded-data buffer 570. Moreover, if there is the first code word to which error correction has failed and on which only error detection is implementable, the first-code error detection and correction section 520 outputs error detection notification of the first code word to the CPU 330 through the bus 360. When the ECC processing section 400 notifies the CPU 330 in the error detection notification that the error has been detected, the CPU 330 reads a part (a second parity used to configure partial data with the first code word of which decoding has been attempted) of the second parity, and inputs the part of the second parity to the second-code error detection and correction section 530.

It is to be noted that the first-code error detection and correction section 520 corresponds to a specific example of "first-code error detection section" in an embodiment of the present technology.

Moreover, the first-code error detection and correction section 520 corrects the error in the first code by the hard-decision decoding method; however, the error may be corrected by a soft-decision decoding method in which a likelihood (such as a log-likelihood ratio) of a value of each symbol is determined. For example, a method described in "Makiko Kan, et al., Hardware Implementation of Soft-Decision Decoding for Reed-Solomon Code, 2008 5th International Symposium on Turbo Codes and Related Topics" may be used. In this literature, a unit corrects an error in data by a belief propagation method such as a sum-product algorithm, based on a likelihood (such as a log-likelihood ratio) of each symbol of a first code such as an RS code. In this literature, diagonalization of a check matrix is performed; however, when the method is applied to embodiments of the present technology, diagonalization is not necessary. When the soft-decision decoding method is also used to correct the error in the first code, error correction capability is improved.

The second-code error detection and correction section 530 is configured to correct, based on one or both of partial data adjacent to target partial data for correction in which an error is detected by the first-code error detection and correction section 520, the error in the target partial data. Partial data A "adjacent to" partial data B means that the partial data A is generated immediately before or immediately after the partial data B in order of encoding. Hereinafter, the partial data adjacent in such a manner is referred to as "adjacent partial data". When the second-code error detection and correction section 530 receives the second parity, the second-code error detection and correction section 530 generates partial data containing the first code word decoded by the first-code error detection and correction section 520 and that second parity. For example, the second-code error detection and correction section 530 may correct an error in partial data with use of the soft-decision decoding method. A method of correcting the error will be described in detail later. The second-code error detection and correction section 530 outputs the partial data in which the error is corrected to the first-code error detection and correction section 520 through a signal line 539. The first-code error detection and correction section 520 stores the first code word in the partial data in the decoded-data buffer 570.

It is to be noted that the second-code error detection and correction section 530 corresponds to a specific example of "second-code error correction section" in an embodiment of the present technology.

The decoded-data buffer 570 is configured to hold the decoded first code word. The decoded-data supply section 580 is configured to read the first code word in which the error is corrected from the decoded-data buffer 570, and to supply, to the bus 360, decoded data corresponding to target data for first-code encoding.

Figure 4:
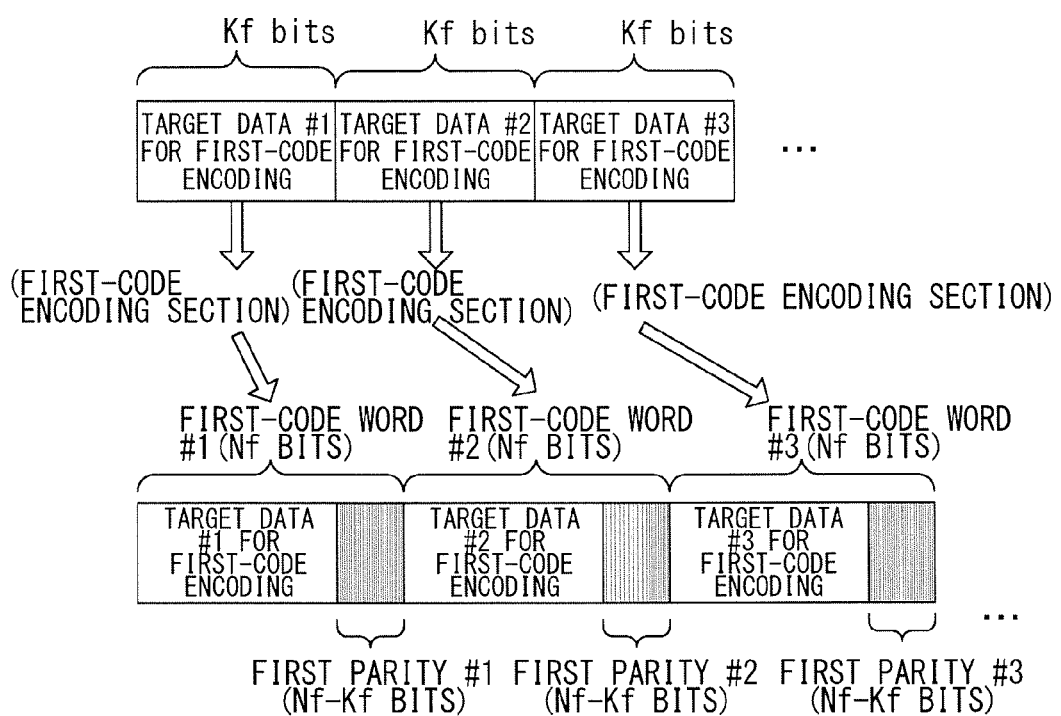
FIG. 4 is a diagram for describing block encoding according to the first embodiment.

FIG. 4 is a diagram for describing first-code encoding according to the first embodiment. As illustrated in FIG. 4, the first-code encoding section 410 encodes respective target Kf-bit data for first-code encoding into respective Nf-bit first code words, where Kf is an integer, and Nf is an integer greater than Kf. Each of the first code words contains the target Kf-bit data for first-code encoding and an Nf−Kf-bit first parity. Thus, the code word contains the target data for encoding as it is, and a code capable of easily separating the code word into data and a parity is referred to as "systematic code". It is to be noted that the first code may be a nonsystematic code.

Configuration Example of Second-Code Encoding Section

Figure 5:
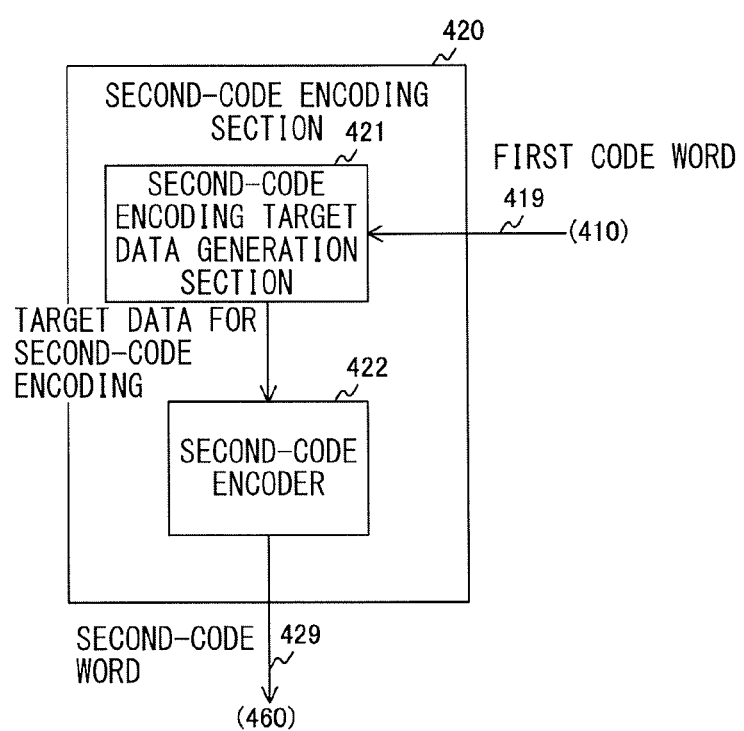
FIG. 5 is a block diagram illustrating a configuration example of a second-code encoding section according to the first embodiment.
Figure 7:
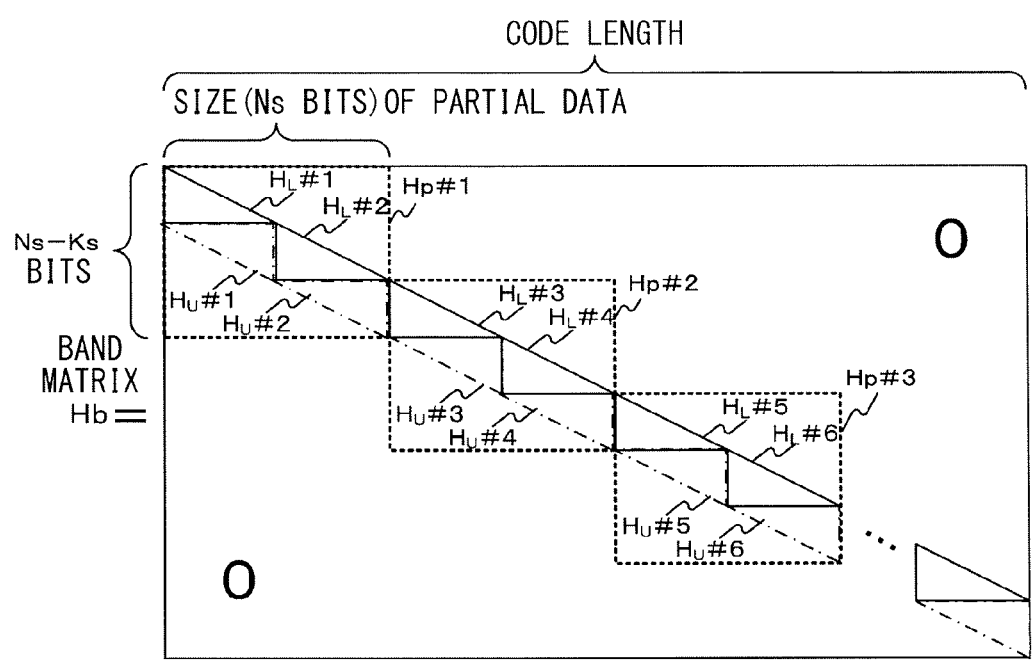
FIG. 7 is a diagram illustrating an example of a band matrix according to the first embodiment.

FIG. 5 is a block diagram illustrating a configuration example of the second-code encoding section 420 according to the first embodiment. The second-code encoding section 420 includes a second-code encoding target data generation section 421 and a second-code encoder 423.

The second-code encoding target data generation section 421 is configured to collectively supply, to the second-code encoder 423, a plurality of first codes from the first-code encoding section 410 as second-code encoding target data.

The second-code encoder 422 is configured to encode target data for second-code encoding into the second code word. In encoding into the second code, for example, an encoding system in which data is encoded into a binary spatially-coupled LDPC (Low Density Parity Check) code may be used. A method of encoding into the spatially-couple LDPC code will be described in detail later referring to FIGS. 6A and 6B, 7, and 8A and 8B, and the like.

It is assumed that the second-code encoder 422 holds a generator matrix. However, the second-code encoder 422 may generate a generator matrix from a check matrix. The check matrix is a matrix used in a process of performing a parity check on the second code, and the generator matrix is a matrix used to encode target data for encoding. The generator matrix may be determined from the check matrix by the following expression 1. [Math. 1]

$$G \times H^T = 0 \qquad \text{Expression 1}$$

where "G" is a generator matrix, and "$H^T$" is a matrix formed by inverting a check matrix H.

The second-code encoder 423 determines a product of the generator matrix obtained by the expression 1 and the target data for second-code encoding. The second-code encoder 423 outputs the obtained product as the second code word to the encoded-data buffer 460 through a signal line 428.

It is to be noted that, as long as the second code is a code generated by encoding a plurality of data in chains, the second code is not limited to the spatially-coupled LDPC code. For example, a convolution code or a turbo code which will be described later may be used instead of the spatially-coupled LDPC code. Moreover, the second-code encoding section 420 may use a higher-than-binary code as the second code. This is also applicable to modification examples which will be described later of the first embodiment.

FIGS. 6A and 6B are diagrams illustrating an example of a regular check matrix $H_{reg}$ according to the first embodiment. In the spatially-coupled LDPC encoding system, a plurality of regular check matrices $H_{reg}$ are generated by the second-code error detection and correction section 530. These regular check matrices $H_{reg}$ are check matrices in which the number of "1"s (hereinafter referred to as "weight") in each of rows and columns is fixed. FIG. 6A is a diagram illustrating an example of weights in the regular check matrix $H_{reg}$. In this example, the weight of each column is "3", and the weight of each row is "6".

The second-code error detection and correction section 530 generates an upper triangular matrix $H_U$ and a lower triangular matrix $H_L$ by diagonally dividing the regular check matrix $H_{reg}$ into two parts. FIG. 6B is a diagram illustrating an example of the divided regular check matrix $H_{reg}$. Hereinafter, one side of two sides forming a right angle in each triangular matrix is referred to as "bottom side", and the other side is referred to as "adjacent side".

In the spatially-coupled LDPC, partial decoding is allowed to be performed with use of a partial matrix $H_p$ cut from a band matrix $H_b$. When a size Ns of partial data is set in the second-code error detection and correction section 530, the second-code error detection and correction section 530 cuts a partial matrix with a size equivalent to Ns from the band matrix $H_b$. For example, in a case where the size Ns of the partial data is equal to a length that is twice as large as the bottom side of the triangular matrix, a partial matrix formed by combining four triangular matrices with one another may be used as the check matrix in decoding of the partial data. The check matrix $H_p$ is a matrix having an equal number of columns to the size Ns of the partial data and an Ns–Ks-number of rows. Moreover, in a case where the entire second code word is decoded, the band matrix $H_b$ may be used as the check matrix. The number N of columns in the band matrix $H_b$ is a code length of the second code word.

Ks is a size of data that is partial data without the second parity. In other words, Ns–Ns is a size of the second parity in the partial data. Moreover, the size Ns of the partial data may be set to, for example, a divisor of an access unit of the non-volatile memory 600. It is to be noted that the size Ns of the partial data may be set to a multiple of the access unit of the non-volatile memory 600.

Figures 8A, 8B:
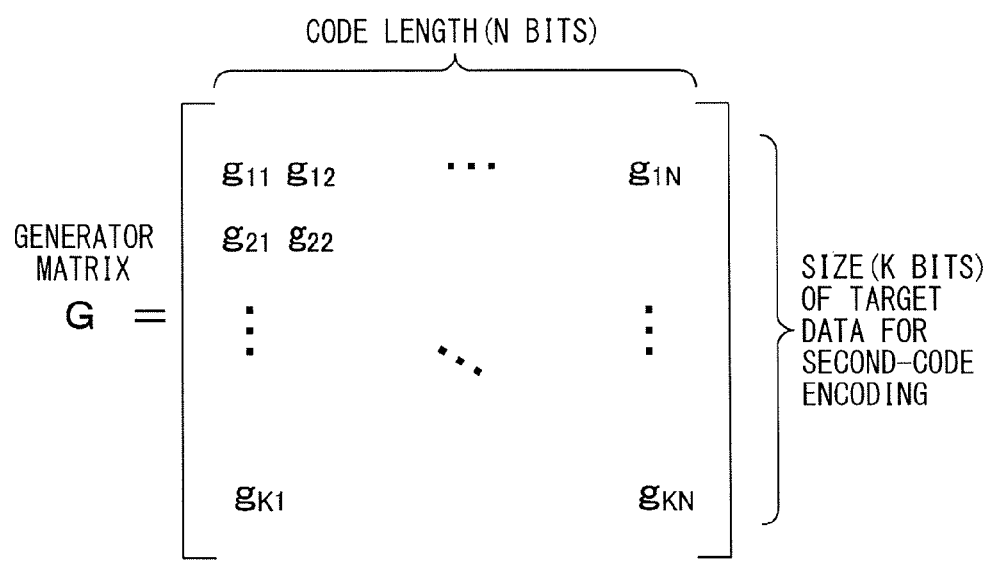
FIGS. 8A and 8B are diagrams for describing a method of using a generator matrix according to the first embodiment.

FIGS. 8A and 8B are diagrams for describing a method of using a generator matrix according to the first embodiment. FIG. 8A is a diagram illustrating an example of the generator matrix G according to the first embodiment. The generator matrix G exemplified in FIG. 8A is generated from the band-like check matrix $H_b$ exemplified in FIG. 7, based on the expression 1. In a case where the number of columns and the number of rows in the check matrix $H_b$ are N and N–K, respectively, as illustrated in FIG. 8A, the generator matrix G with an N-number of columns and a K-number of rows is generated from the check matrix $H_b$. FIG. 8B illustrates an example of a calculation expression used to determine the second code from the generator matrix and the target data for second-code encoding. As illustrated in FIG. 8B, the second code word is generated by a product of the generator matrix G and the target data for second-code encoding. The second code word contains k-bit target data for second-code encoding and an N–K-bit second parity. Therefore, the second code is a systematic code containing the target data for encoding as it is. When the second code is configured of a systematic code, the ECC processing section 400 is allowed to easily separate only the first code and correct an error in the first code in decoding.

Figure 9:
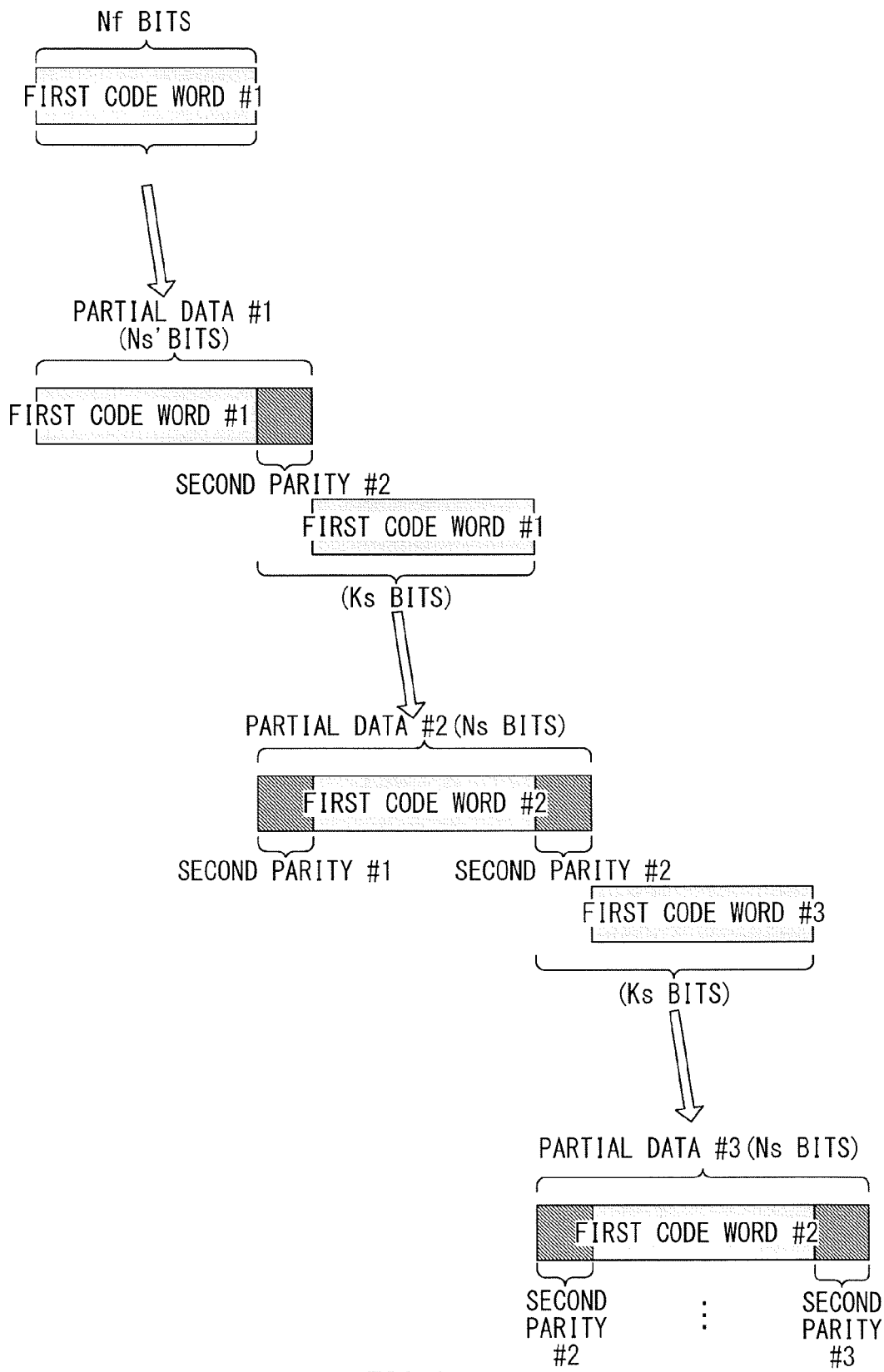
FIG. 9 is a diagram for describing an example of a data dependency relationship in a second code according to the first embodiment.

FIG. 9 is a diagram for describing an example of a data dependency relationship in the second code according to the first embodiment. In FIG. 9, an arrow indicates a dependency relationship. Each partial data is generated dependently on a state of partial data adjacent thereto by a matrix operation illustrated in FIGS. 8A and 8B. However, partial data at an end does not contain a second parity adjacent thereto; therefore, the size of the partial data at the end is smaller than the size of other partial data. It is to be noted that, in a case where the size of the partial size at the end is adjusted to be equal to the size of the other partial data, dummy data with an equal size to the size of the second parity may be added instead of the second parity.

For example, partial data #1 is configured of the first code word #1. Second partial data #2 is dependent on a second parity #1 adjacent thereto. Third partial data #3 is dependent on a second parity #2 adjacent thereto. Thus, each of partial data other than first partial data is dependent on a part (for example, a second parity) of partial data adjacent thereto. A combination of these partial data corresponds to one second code word. Thus, in the spatially-coupled LDPC coding system, the second code word is generated in chains. It is to be noted that the dependency relationship is not limited to a relationship exemplified in FIG. 9. For example, each of the partial data may be dependent on the entire partial data adjacent thereto or a plurality of other partial data.

Figure 10:
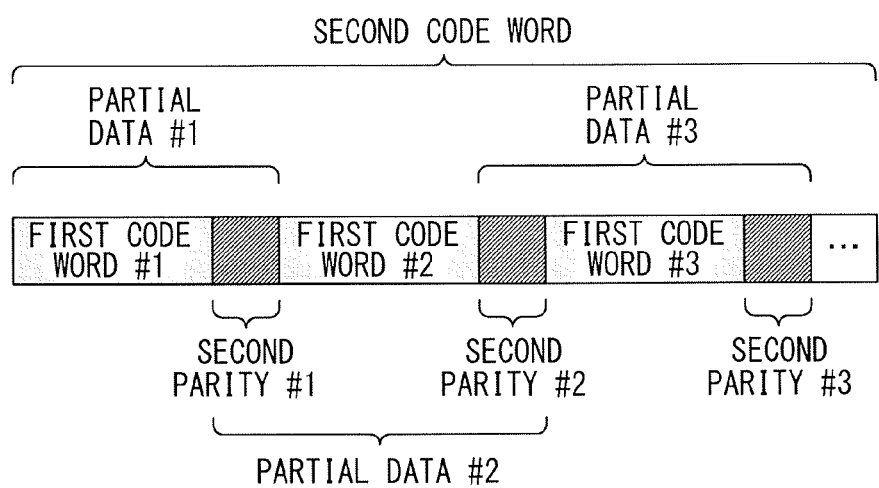
FIG. 10 is a diagram illustrating an example of a data structure of the second code according to the first embodiment.

FIG. 10 is a block diagram illustrating an example of a data structure of the second code in the non-volatile memory 600 according to the first embodiment. As illustrated in FIG. 10, the second code word contains a plurality of partial data. Each of the partial data is dependent on the second parity adjacent thereto. Therefore, a code in which a part (i.e., the second parity) of data is common to partial data adjacent to each other is generated as the second code.

Configuration Example of Second-Code Error Detection and Correction Section

Figure 11:
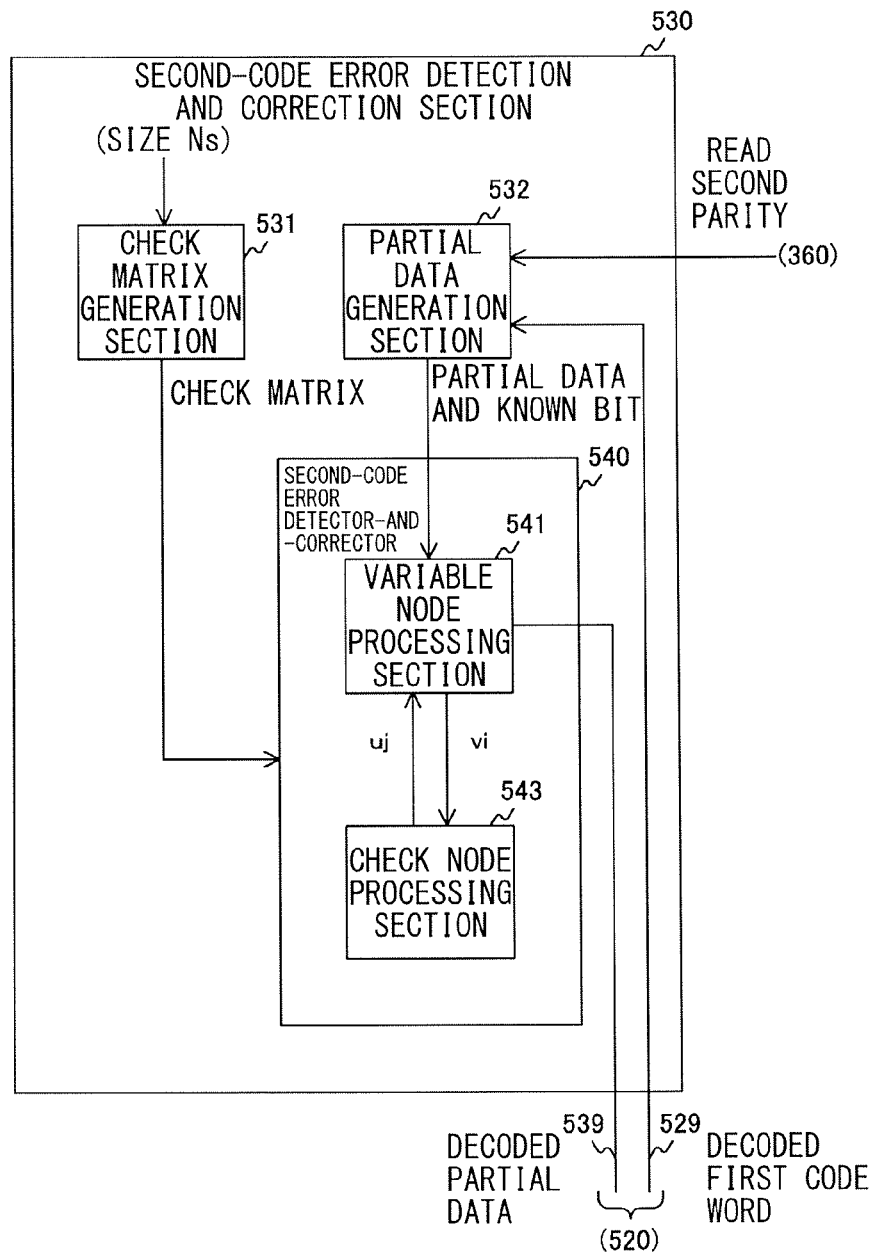
FIG. 11 is a block diagram illustrating a configuration example of a second-code error detection and correction section according to the first embodiment.

FIG. 11 is a block diagram illustrating a configuration example of the second-code error detection and correction section 530 according to the first embodiment. The second-code error detection and correction section 530 includes a check matrix generation section 531, a partial data generation section 532, and a second-code error detector-and-corrector 540.

The check matrix generation section 531 is configured to generate a check matrix. In the check matrix generation section 531, the size Ns of partial data is set. The check matrix generation section 531 generates a check matrix with an Ns-number of columns. The check matrix generation section 531 supplies the generated check matrix to the second-code error detector-and-corrector 540.

The partial data generation section 532 is configured to decode the first code contained in partial data adjacent to partial data containing the first code of which decoding has failed. It is assumed that reading of the adjacent partial data is controlled by the CPU 330, and decoding of the first code contained in the read partial data is successful. Next, the partial data generation section 532 outputs target partial data for correction and partial data adjacent to the target partial data to the second-code error detector-and-corrector 540. At this time, each of bits of the first code of which decoding is successful is specified as a known bit, and the partial data containing the known bit is output to the second-code error detector-and-corrector 540.

The known bit means a bit in which an error has been corrected and a corrected value is known. As described above, partial data adjacent to each other shares the second parity with each other; therefore, when an error in partial data adjacent to the target partial data for correction is corrected, an error in the second parity in the target partial data is also corrected accordingly. Therefore, the partial data generation section 532 is allowed to specify each bit of the first code as the known bit. Error correction to the target partial data for correction is easily executed by specifying the known bit.

Moreover, in generation of partial data, in a case where partial data adjacent thereto has been corrected by the second-code error detector-and-corrector 540, the partial data generation section 532 acquires the second parity of the corrected adjacent partial data without inputting the corrected adjacent partial data to the second-code error detector-and-corrector 540 again. For example, a case is considered where error correction to the first code words in partial data #1 and #3 out of partial data #1, #2, #3, and #4 has failed and error correction to the partial data #2 adjacent to the partial data #1 and #3 is performed. In a case where the memory controller 300 performs error correction to the partial data #3 after the memory controller 300 performs correction to the partial data #2 and #1 in this order and the correction to both of the partial data #2 and #1 is successful, the partial data #2 out of the partial data #2 and #4 adjacent to the partial data #3 has been already corrected. In this case, since correction to the partial data #2 is not necessary, the memory controller 300 may correct the partial data #4 and #3 in this order without correcting the partial data #2 again. The partial data generation section 532 may generate a flag, for each partial data, indicating whether or not correction has been made, and may store the flag in the decoded-data buffer 570, and may determine, referring to the flag, whether or not correction has been made.

In a case where, since adjacent partial data has been already corrected, correction to the adjacent partial data is not performed, the partial data generation section 532 generates partial data from a read first code word of which decoding has failed in the first-code error detection and correction section and a read second parity, and outputs the thus-generated partial data to the second-code error detection and correction section.

The second-code error detector-and-corrector 540 is configured to detect and correct an error in partial data in the second code word with use of the check matrix. The second-code error detection and correction section 530 may correct the error in the partial data with use of a sum-product algorithm. In a configuration with use of the sub-product algorithm; the second-code error detector-and-corrector 540 includes a variable node processing section 541 and a check node processing section 543. Algorithms classified as the sum-product algorithm may include various algorithms such as a probability-domain sum-product algorithm and a log-domain sum-product algorithm. The variable node processing section 541 and the check node processing section 543 may correct the error in the second code with use of, for example, the log-domain sum-product algorithm selected from these algorithms.

It is to be noted that the variable node processing section 541 and the check node processing section 543 may use any sum-product algorithm other than the log-domain sum-product algorithm.

Moreover, the second-code error detector-and-corrector 540 may use any algorithm such as a bit-flipping algorithm other than the sum-product algorithms, as long as the algorithm is allowed to detect and correct an error in the second code word. Further, an algorithm (such as min-sum algorithm) in which a part of a sum-product algorithm is simplified may be used. Alternatively, a technique described in "Shuhei Tanakamaru et. al., Over-10×-Extended-Lifetime 76%-Reduced-Error Solid-State Drives (SSDs) with Error-Prediction LDPC Architecture and Error-Recovery Scheme, ISSCC 2012" may be used. In an EP (Error-Prediction)-LDPC method described in this literature, a unit measures the number of times data is rewritten and a data holding time per memory cell in advance and stores the number of times data is rewritten and the data holding time in tables. Then, the unit predicts a BER (Bit Error Rate), based on these tables, and then corrects an error in an LCPC code with use of the BER.

The variable node processing section 541 is configured to detect and correct the error in the second code word, based on a result of a parity check by the check node processing section 543. Moreover, the check node processing section 543 is configured to perform a parity check on the second code word. Partial data in the second code word is input to the variable node processing section 541. It is to be noted that, as will be described later, in a case where correction to the partial data has failed, the partial data generation section 532 may input the entire second code word to the variable node processing section 541.

More specifically, when the variable node processing section 541 receives the second code word, the variable node processing section 541 generates a message $u_{0\_i}$, based on the second code word. The message $u_{0\_i}$ is a real variable representing a likelihood that a value of an ith symbol (for example, bit) in the second code word before being corrected is "0" or "1". Moreover, "i" is an integer of 0 to Ns−1, where Ns is a size of the second code word. However, in a case where the ith bit is specified as the known bit by the partial data generation section 532, the likelihood of the message $u_{0\_i}$ is set to a maximum value. The variable node processing section 541 generates a message $v_i$, based on the message $u_{0\_i}$ and a result of the parity check by the check node processing section 543, and outputs the message $v_i$ to the check node processing section 543. The message $v_i$ is a real variable representing a likelihood of a value of an ith bit in the corrected second code word. In the log-domain sum-product algorithm, a log-likelihood ratio $\Lambda(r_i)$ is generated as the message $u_{0\_i}$. The log-likelihood ratio $\Lambda(r_i)$ is a log of a ratio of probability that the value of the ith symbol (for example, bit) of the code word is "0" to probability that the value of the ith symbol of the code word is "1", and may be determined by the following expression 2, for example.

[Math. 2]

$$\Lambda(r_i) = \ln \frac{P(r_i = 1|r)}{P(r_i = 0|r)} \qquad \text{Expression 2}$$

where r is a received second code word, $P(r_i=1|r)$ is probability that the value of an ith bit $r_i$ in the second code word is "1", and $P(r_i=0|r)$ is probability that the value of the ith bit $r_i$ in the second code word is "0".

It is to be noted that the message $u_{0\_i}$ is not limited to the log-likelihood ratio, as long as the message $u_{0\_i}$ is a value representing likelihood. For example, probability that the value of $r_i$ is "1" or "0" may be adopted as the message $u_{0\_i}$. This is also applicable to other messages $v_j$ and $u_j$.

The check node processing section 543 performs the parity check, based on the message $v_i$, generates the message $u_j$, based on the result of the parity check, and then outputs the message $u_j$ to the variable node processing section 541, where "j" may be an integer of 0 to (Ns−Ks)−1, and Ks is a size of data that is partial data without the second parity. In the log-domain sum-product algorithm, the log-likelihood ratio is output as the message $u_j$.

The variable node processing section 541 and the check node processing section 543 exchange messages therebetween until a predetermined termination condition is satisfied. For example, when messages are exchanged a fixed number of times or when an absolute value of the log-likelihood ratio exceeds a threshold value, it may be determined that the termination condition is satisfied.

When the termination condition is satisfied, the variable node processing section 541 determines a second code word in which an error is corrected, based on the received message $u_j$. The variable node processing section 541 outputs the corrected second code word to the decoded-data buffer 570.

Configuration Example of Second-Code Error Detector-and-Corrector

Figure 12:
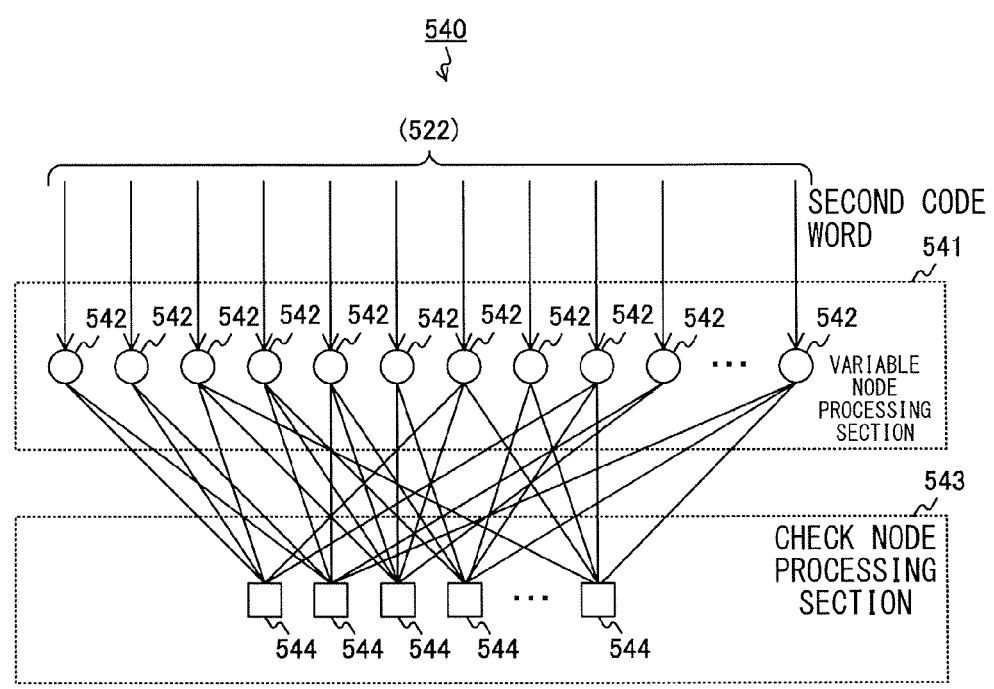
FIG. 12 is a block diagram illustrating a configuration example of a second-code error detector-and-corrector according to the first embodiment.

FIG. 12 is a block diagram illustrating a configuration example of a second-code error detector-and-corrector 540 according to the first embodiment. In the second-code error detector-and-corrector 540, the variable node processing section 541 includes an equal number of variable nodes 542 to the number of bits of the second code word (i.e., the number of columns of the check matrix $H_p$). Moreover, the check node processing section 543 includes an equal number of check nodes 544 to the number of bits of the second parity in the second code word (i.e., the number of rows of the check matrix $H_p$). Then, the check node 544 and the variable nodes 542 are connected to each other, based on a value of a component of the check matrix $H_p$. More specifically, when a value of a component in a jth row and an ith column is "1", a jth check node 544 and an ith variable node 542 are connected to each other, and when the value of the component is "0", these nodes are not connected to each other.

The ith variable node 542 is configured to detect and correct an error in an ith symbol (for example, bit) in second code word, based on a result of the parity check by the check node 544. The jth check node 544 performs a parity check corresponding to the jth row of the check matrix $H_p$.

More specifically, the ith variable node 542 receives the ith bit of the second code word from the partial data generation section 532, and generates the message $u_{0\_i}$, based on the value of the bit. In a case where the message $u_{0\_i}$ is the log-likelihood ratio, when the value of the ith bit is "1", a predetermined positive value smaller than a maximum value Max is set to $u_{0\_i}$. On the other hand, when the value of the ith bit is "0", a predetermined negative value greater than a minimum value Min is set to $u_{0\_i}$. The maximum value Max and the minimum value Min are a maximum value and a minimum value, respectively, that are dependent on a data type and data size of the log-likelihood ratio. For example, in a case where, for example, signed fixed-point data is used for operation, a numerical range allowed to be represented by the data is a range corresponding to the number of bits in each of a real part and an imaginary part. A maximum value and a minimum value in the numerical range are used as the maximum value Max and the minimum value Min. It is to be noted that the second-code error detector-and-corrector 540 may use signed floating-point data for operation.

However, in a case where the ith bit is specified as the known bit, a value allowing the likelihood to be maximized is set. For example, in a case where the value of ith known bit is "1", the maximum value Max may be set to $u_{0\_i}$, and in a case where the value of the ith known bit is "0", the minimum value Min is set to $u_{0\_i}$.

After the message $u_{0\_i}$ is generated, the variable node 542 sets an initial value (for example, "0") to the message $u_j$ from each of the check nodes 544 connected thereto. Then, the variable node 542 determines the message $v_i$ by calculation with use of the following expression 3, and outputs the message $v_i$ to one of the check nodes 544 connected thereto.

[Math. 3]

$$v_i = u_{0\_i} + \sum_{j=1}^{d_v - 1} u_j \quad \text{Expression 3}$$

where $d_v$ is the number of "1"s (i.e., weight) in a column of the check matrix $H_p$.

When the check node 544 receives the message $v_i$ from each of the variable nodes 542 connected thereto, the check node 544 determines the message $u_j$ by calculation with use of the following expression 4, and outputs the message $u_j$ to one of the variable nodes 542 connected thereto.

[Math. 4]

$$\tanh\left(\frac{u_j}{2}\right) = \prod_{i=1}^{d_c - 1} \tanh\left(\frac{v_i}{2}\right) \quad \text{Expression 4}$$

where $d_c$ is the number of "1"s (i.e., weight) in a row of the check matrix $H_p$, tan h( ) is a hyperbolic tangent function, and Πx is an infinite product of x.

This expression 4 may be transformed into an expression 6 with use of the expression 5.

[Math. 5]

$$a \times b = \exp(\ln|a| + \ln|b|) \times \text{sign}(a) \times \text{sign}(b) \quad \text{Expression 5}$$

[Math. 6]

$$u_j = 2\tanh^{-1}\left(\prod_{i=1}^{d_c-1} \tanh\left(\frac{v_i}{2}\right)\right) \quad \text{Expression 6}$$

$$= 2\tanh^{-1}\left[\exp\left\{\prod_{i=1}^{d_c-1} \ln\left(\left|\tanh\left(\frac{v_i}{2}\right)\right|\right)\right\} \times \prod_{i=1}^{d_c-1} \text{sign}\left(\tanh\left(\frac{v_i}{2}\right)\right)\right]$$

$$= 2\tanh^{-1}\left[\exp\left\{-\left(\prod_{i=1}^{d_c-1} -\ln\left(\tanh\left(\frac{|v_i|}{2}\right)\right)\right)\right\} \times \prod_{i=1}^{d_c-1} \text{sign}(v_i)\right]$$

In the expressions 5 and 6, sign(x) is a function returning a value of "1" to an input value x in a case of x≥0, and returning a value of "−1" to the input value x in a case of x<0.

The expression 6 into which the expression 4 is transformed may be further transformed into an expression 8 with use of a function defined in the following expression 7. The check node 544 may determine the message $u_j$ by calculation with use of the expression 8, instead of the expression 4.

[Math. 7]

$$\phi(x) = -\ln\left\{\tanh\left(\frac{x}{2}\right)\right\} \quad \text{Expression 7}$$

[Math. 8]

$$u_j = \phi^{-1}\left(\sum_{i=1}^{d_c-1} \phi(|v_i|)\right) \times \prod_{i=1}^{d_c-1} \text{sign}(v_i) \quad \text{Expression 8}$$

It is to be noted that the message $u_j$ may be determined not only with use of the expression 4 or the expression 8 but also by a simpler operation than the expressions 4 and 8. For example, an operation result of a function $R(v_1, v_2)$ defined by an expression 9 may be calculated in advance for each of possible values of messages $v_1$ and $v_2$. Then, a table associated with the operation result and a combination of the messages $v_1$ and $v_2$ may be formed in advance, and an operation result read from the table may be recursively used as illustrated in an expression 10, thereby easily determining the message $u_j$.

[Math. 9]

$$R(v_1, v_2) = 2\, \tanh^{-1}\left\{\tanh\!\left(\frac{v_1}{2}\right)\tanh\!\left(\frac{v_2}{2}\right)\right\} \quad \text{Expression 9}$$

[Math. 10]

$$u_j = R(v_1, R(v_2, R(v_3 \ldots R(v_{d_c-2}, v_{d_c-1})))) \quad \text{Expression 10}$$

The variable node 542 and the check node 544 generate the messages $v_i$ and $u_j$ with use of the expressions 3 and 4, and the like, and exchange these messages therebetween until a predetermined termination condition is satisfied.

When the termination condition is satisfied, the variable node 542 generates a message $v_i'$ with use of the following expression 11. The variable node 542 determines the value of the ith bit of the second code word, based on the generated message $v_i'$. For example, the variable node 542 may determine the value of the ith bit to "1" in a case of $v_i' \geq 0$ and "0" in a case of $v_i' < 0$. Thus, the error in the second code word is corrected. The variable node 542 outputs partial data corrected in the second code word to the first-code error detection and correction section 520.

[Math. 11]

$$v_i' = u_{0\_i} + \sum_{j=1}^{d_v} u_j \quad \text{Expression 11}$$

It is to be noted that the variable node 542 may execute an operation of the expression 3 by separating the expression 3 into the expression 11 and the following expression 12. In this case, in a case where the termination condition is not satisfied, the variable node 542 outputs, to the check node 544, the message $v_i$ determined by the expression 12. Then, when the termination condition is satisfied, the variable node 542 determines a value of a bit in the second code word, based on the message $v_i'$ determined by the expression 11.

[Math. 12]

$$v_i = v_i' - u_{d_v} \quad \text{Expression 12}$$

where $u_{d_v}$ is a message from a $d_v$th check node 544 connected to the variable node 542.

Figure 13A:
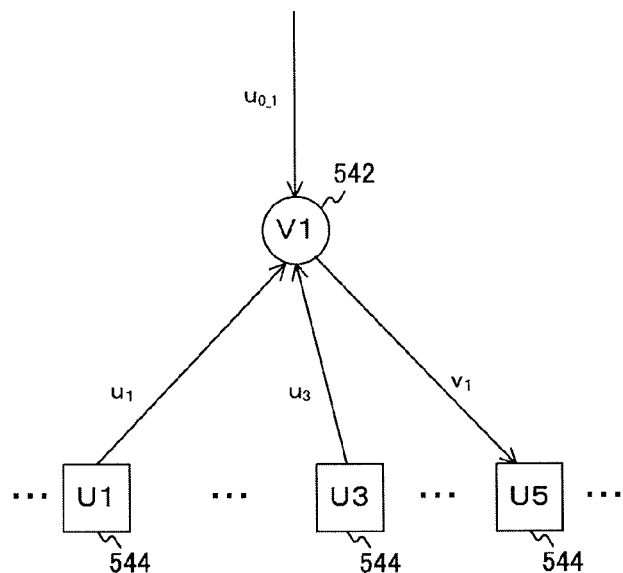
FIGS. 13A and 13B are diagrams illustrating an example of message exchange between a variable node and a check node according to the first embodiment.
Figure 13B:
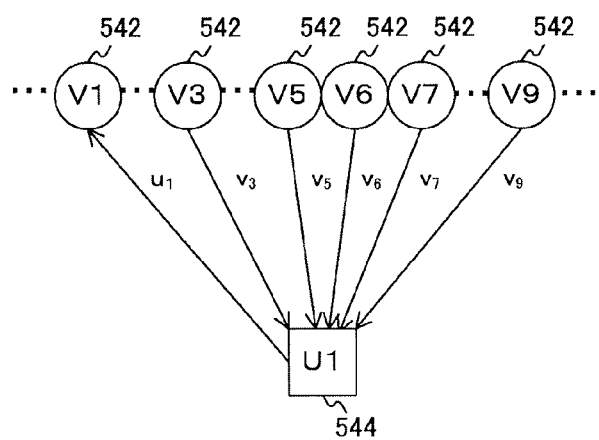

FIGS. 13A and 13B are diagrams illustrating an example of message exchange between the variable nodes 542 and the check nodes 544 according to the first embodiment. FIG. 13A is a diagram illustrating an example of message exchange when the variable node 542 generates the message $v_i$. For example, it is assumed that a first variable node V1 is connected to first, third, and fifth check nodes U1, U3, and U5. In this case, when the variable node V1 receives the message $u_{0\_i}$ from the partial data generation section 532, and receives messages $u_1$ and $u_3$ from the check nodes U1 and U3, the variable node V1 generates a message $v_1$, based on these messages, and outputs the message $v_1$ to the check node U5.

FIG. 13B is a diagram illustrating an example of message exchange when the check node 544 generates the message $u_j$. For example, it is assumed that the first check node U1 is connected to first, third, fifth, sixth, seventh, and ninth variable nodes V1, V3, V5, V6, V7, and V9. In this case, when the check node U1 receives messages $v_3$, $v_5$, $v_6$, $v_7$, and $v_9$ from the variable nodes V3, V5, V6, V7, and V9, the check node U1 generates the message $u_i$, based on the these messages, and outputs the message $u_1$ to the variable node V1.

Figure 14:
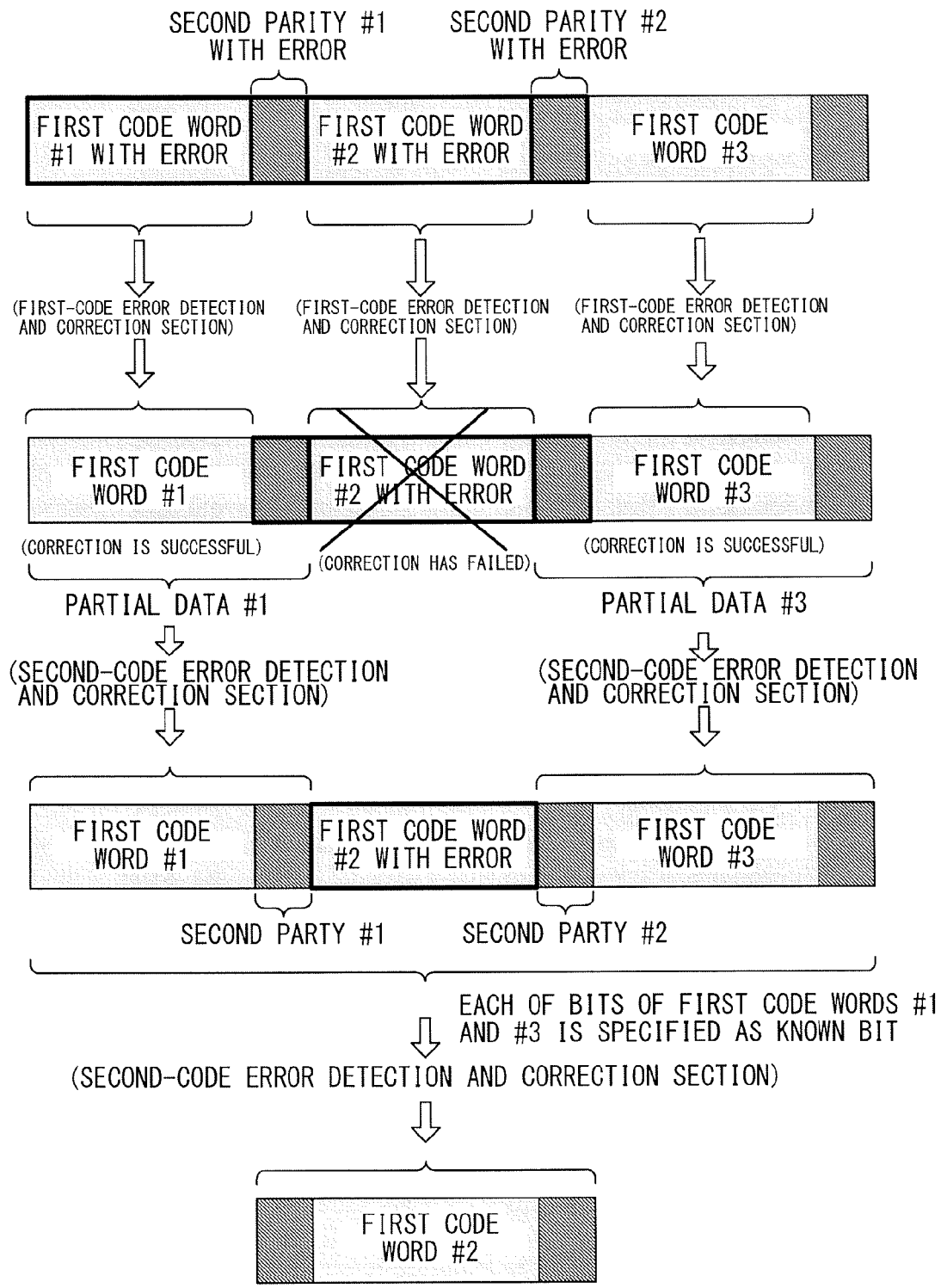
FIG. 14 is a diagram for describing a method of correcting the second code according to the first embodiment.

FIG. 14 is a diagram for describing a method of correcting the second code word according to the first embodiment. For example, a case is considered where a second code containing first code words #1, #2, and #3 is corrected. The first code word #1 of these first code words has a correctable number by first-code error detection and correction section 520 of errors, and the first code word #2 has an uncorrectable number of errors. Moreover, it is assumed that each of second parities #1 and #2 added corresponding to them also has an error.

The first-code error detection and correction section 520 corrects the errors in the respective first code words #1, #2, and #3. In this correction, the first-code error detection and correction section 520 succeeds in correction to the first code word #1 with the correctable number of errors, but fails correction to the first code word #2 with the uncorrectable number of errors.

In this case, the second-code error detection and correction section 530 corrects the errors in the partial data #1 and #3 adjacent to the first code word #2 to which the correction has failed. The errors in the second parity #1 of the partial data #1 and the second parity #2 of the partial data #3 are corrected by correction to these partial data.

Then, the second-code error detection and correction section 530 corrects the errors in the partial data #2 containing the first code word #2 to which the correction has failed. In the partial data #2, the errors in the second parities #1 and #2 have been corrected; therefore, the second-code error detection and correction section 530 is allowed to be accurately correct the errors with use of the values of bits thereof as known values.

Thus, the second-code error detection and correction section 530 performs error correction to partial data adjacent to target partial data with an error for correction, thereby correcting an error in the second parity of the target partial data for correction. Therefore, an error in data is allowed to be corrected more accurately than in a case where only partial data with an error is corrected. Moreover, the second-code error detection and correction section 530 corrects not a whole of the second code word but a part of the second code word; therefore, the error in the data is allowed to be corrected at higher speed than in a case where the entire second code word is corrected. Further, it is not necessary to read the entire second code word to a working memory in error correction; therefore, the second-code error detection and correction section 530 is allowed to be configured of a smaller-scale circuit than a circuit used in a case where the entire second code is read.

It is to be noted that the second-code error detection and correction section 530 corrects both of partial data (partial data #1 and #3) adjacent to the first code word to which correction has failed; however, the second-code error detection and correction section 530 may correct only one of the partial data. When one of the partial data is corrected, the error in one of the second parity #1 and the second parity #2 in the target partial data for correction is corrected. When only one of the adjacent partial data is corrected, the second-code error detection and correction section 530 is allowed to correct an error in data at higher speed than in a case where both of the adjacent partial data are corrected.

Figure 15:
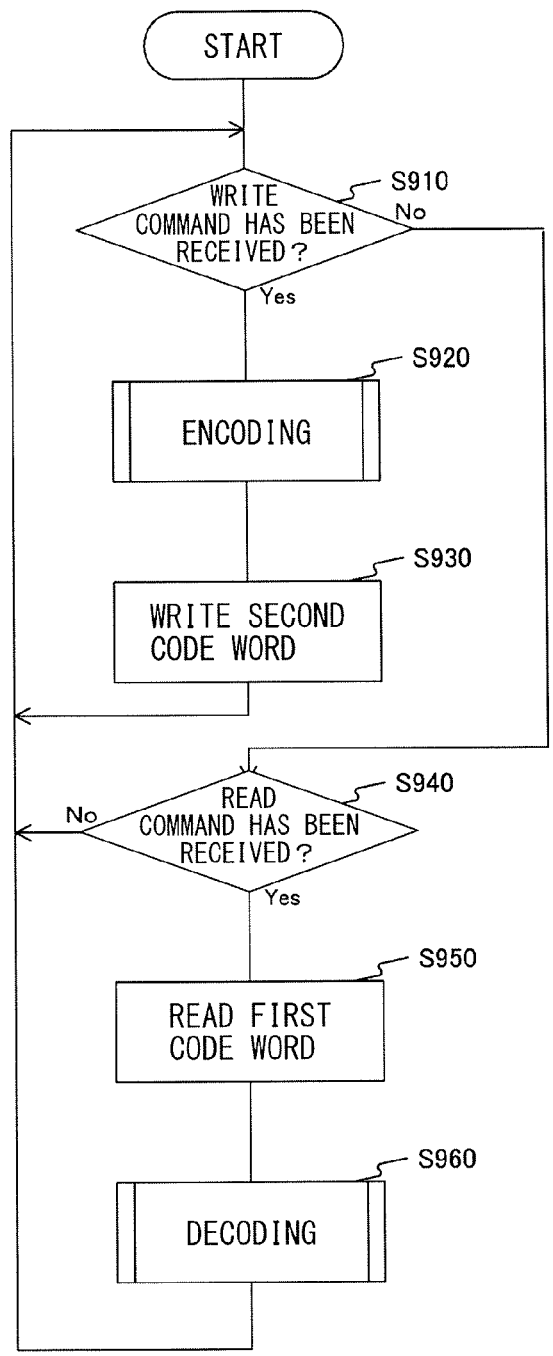
FIG. 15 is a flow chart illustrating an example of an operation of the memory controller according to the first embodiment.

FIG. 15 is a flow chart illustrating an operation of the memory controller 300 according to the first embodiment. For example, the operation may start when the memory controller 300 is powered on.

The memory controller 300 determines whether or not a write command has been received from the host system 100 (step S910). In a case where the memory controller 300 has received the write command (step S910: Yes), the memory controller 300 executes encoding to encode write data (step S920). The memory controller 300 writes, to the non-volatile memory 600, write data encoded into the second code word (step S930). After the step S930, the memory controller 300 returns to the step S910.

In a case where the memory controller 300 has not received the write command (step S910: No), the memory controller 300 determines whether or not a read command has been received (step S940). In a case where the memory controller 300 has received the read command (step S940: Yes), the memory controller 300 reads read data encoded into the first code word (step S950). Then, the memory controller 300 executes decoding to decode the encoded read data (step S960). In a case where the memory controller 300 has not received the read command (step S940: No), or after the step S960, the memory controller 300 returns to the step S910.

Figure 16:
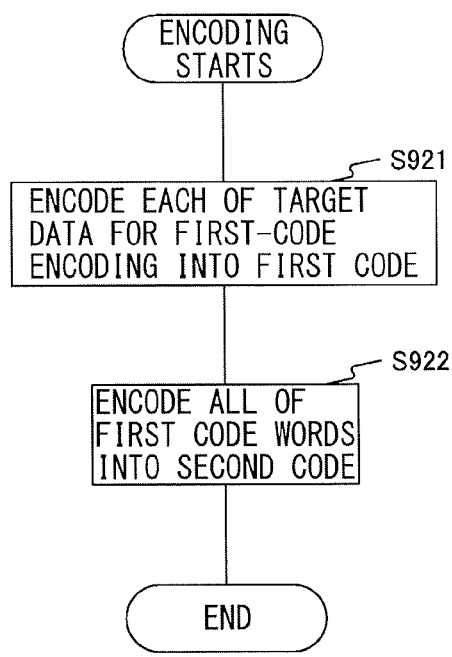
FIG. 16 is a flow chart illustrating an example of encoding according to the first embodiment.

FIG. 16 is a flow chart illustrating an example of encoding according to the first embodiment. The memory controller 300 encodes each of write data as target data for first-code encoding into the first code word (step S921). The memory controller 300 encodes a plurality of first code words into the second code word (step S922). After the step S922, the memory controller 300 terminates the encoding.

Figure 17:
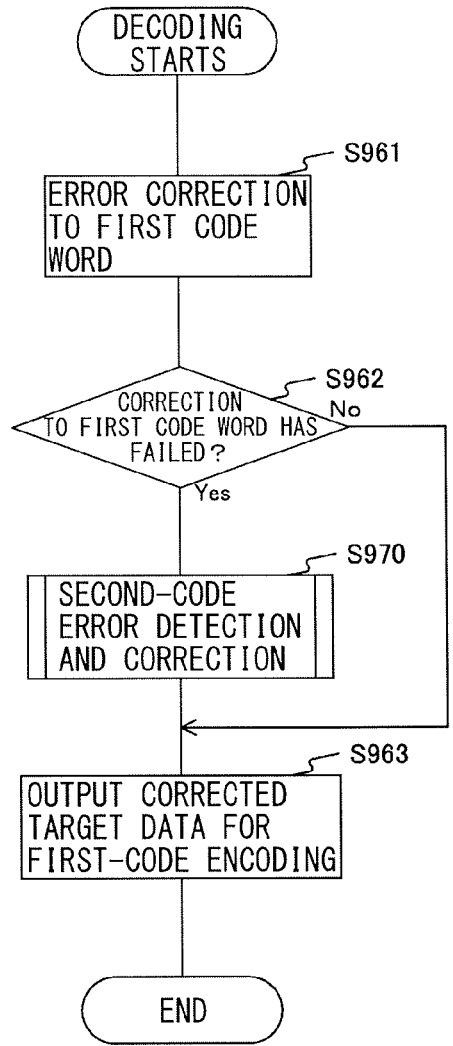
FIG. 17 is a flow chart illustrating an example of decoding according to the first embodiment.

FIG. 17 is a flow chart illustrating an example of decoding according to the first embodiment. The memory controller 300 corrects an error in each of the first code words (step S961). The memory controller 300 determines whether or not error correction to any one of the first code words has failed (step S962). In a case where error correction to any one of the first code words has failed (step S962: Yes), the memory controller 300 executes second-code encoding error detection and correction to correct an error in partial data containing the first code word to which the correction has failed (step S970). In a case where error correction to all of the first code words is successful (step S962: No), or after the step S970, the memory controller 300 takes target data for first-code encoding from the first code in which the error is corrected, and outputs the target data for first-code encoding (step S963). After the step S963, the memory controller 300 terminates the decoding.

Figure 18:
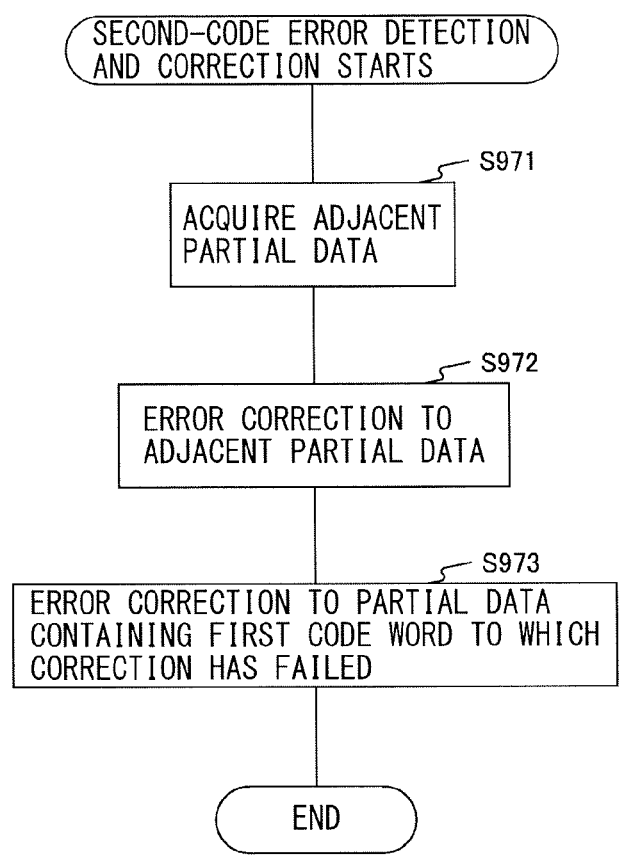
FIG. 18 is a flow chart illustrating an example of second-code error detection and correction according to the first embodiment.

FIG. 18 is a flow chart illustrating an example of second-code encoding error detection and correction according to the first embodiment. The memory controller 300 acquires adjacent partial data adjacent to partial data in which an error is detected (step S971). Then, the memory controller 300 corrects errors in these adjacent partial data (step S972). Then, the memory controller 300 corrects the error in the partial data containing the first code word in which the error is detected with use of, as the known bit, an adjacent first code to which error correction is successful (step S973).

Thus, in the first embodiment, the memory controller 300 encodes each of target data for encoding into the first code word, and encodes the first code words in chains to generate the second code word. Moreover, the memory controller 300 is allowed to correct an error in data, based on one or both of encoded partial data previous to or following partial data containing the first code word in which an error is detected in the second code word. Thus, the memory controller 300 is allowed to correct the error at higher speed than in a case where an error in the entire second code word is corrected. Further, the memory controller 300 is allowed to correct an error more accurately than in a case where only partial data containing the first code word in which an error is detected is corrected.

First Modification Example

In the first embodiment, as exemplified in FIG. 10, a structure in which the second parity is added to each of the first code words is adopted as the data structure of the second code; however, the data structure of the second code is not limited thereto. The memory controller 300 according to a first modification example of the first embodiment differs from that according to the first embodiment in that the second parities are collectively output for every fixed number of first code words.

Figure 19:
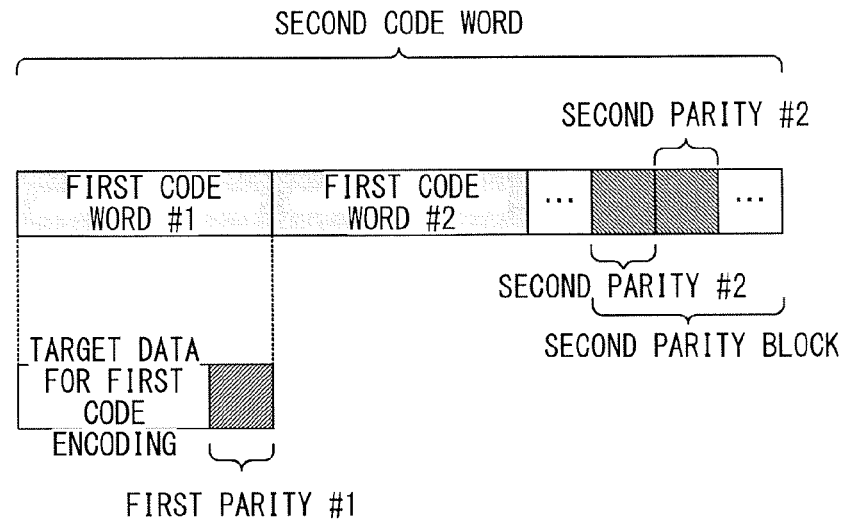
FIG. 19 is a diagram illustrating an example of a data structure of the second code according to a first modification example of the first embodiment.

FIG. 19 illustrates an example of a data structure of the second code according to the first modification example of the first embodiment. As exemplified in FIG. 19, the memory controller 300 according to the first modification example collectively outputs the second parities for every fixed number of first code words. Hereinafter, data containing a fixed number of second parities is referred to as "second parity block". For example, the number of second parities in the second parity block is adjusted to allow a size of the second parity block to be equal to a divisor or a multiple of the access unit of the non-volatile memory 600.

Second Modification Example

In the first embodiment, encoding is performed with use of a unit common to first-code encoding and second-code encoding; however, the unit of the first-code encoding may be different from a decoding unit. The memory controller 300 according to a second modification example of the first embodiment differs from that according to the first embodiment in that the second code word is decoded in a unit different from the unit of the first-code encoding.

Figure 20:
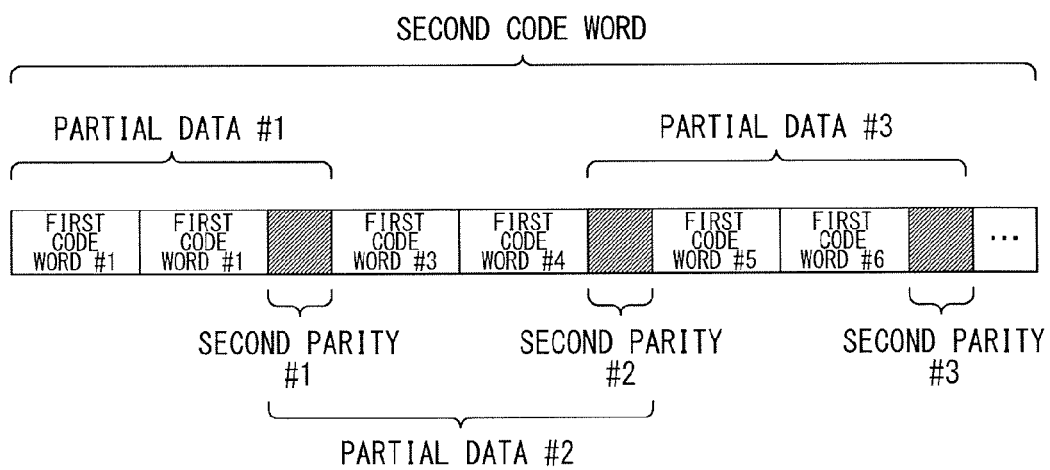
FIG. 20 is a diagram for describing an example of a data structure of the second code word according to a second modification example of the first embodiment.

FIG. 20 is a diagram for describing an example of a data structure of the second code word according to the second modification example of the first embodiment. For example, in a case where the first code words #1 to #4 are encoded, in the second modification example, as exemplified in FIG. 20, a part containing the first code words #1 and #2 may be partial data #1, and a part containing the first code words #3 and #4 may be partial data #2. Thus, the memory controller 300 is allowed to decode the second code word in a unit different from the unit of the first-code encoding.

Third Modification Example

In the first embodiment, the entire first code word is encoded; however, the memory controller 300 may encode a part of the first code word. The memory controller 300 according to a third modification example of the first embodiment differs from that according to the first embodiment in that the memory controller 300 encodes a part of the first code word.

Figure 21:
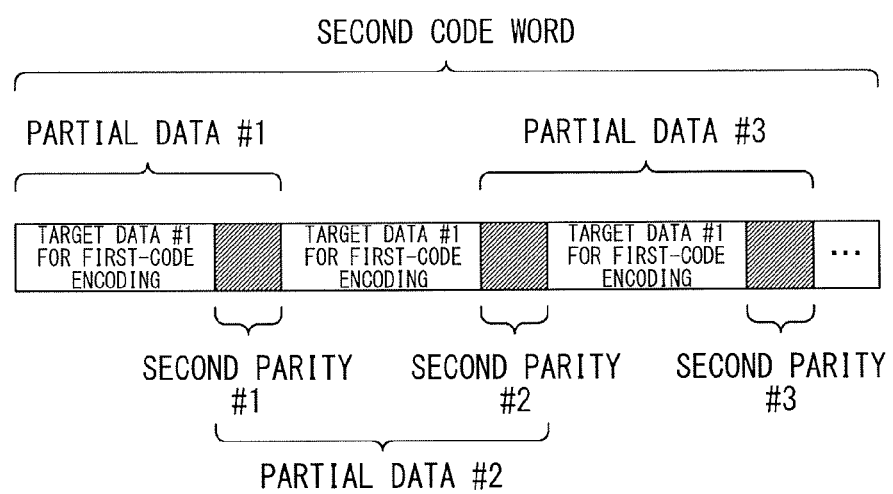
FIG. 21 is a diagram for describing an example of a data structure of the second code word according to a third modification example of the first embodiment.

FIG. 21 is a diagram for describing an example of a data structure of the second code word according to the third modification example of the first embodiment. As exemplified in FIG. 21, the memory controller 300 according to the third modification example may encode only a part of the first code word, for example, only target data for first-code encoding without the first parity into partial data. Therefore, an encoding length of the second code word is allowed to be reduced. The first parity is not illustrated in FIG. 21.

Fourth Modification Example

In the first embodiment, an error in target partial data for correction is corrected after correcting an error in partial data adjacent to the target partial data; however, the memory controller 300 may correct a combination of these partial data as one decoding unit. The memory controller 300 according to a fourth modification example of the first embodiment differs from that according to the first embodiment in that the memory controller 300 collectively corrects the target partial data for correction and partial data adjacent thereto. More specifically, the check matrix generation section 531 combines the check matrix of the target partial data for correction and the check matrix of the partial data adjacent thereto to each other to generate a check matrix with a column number equivalent to a size of data containing the target partial data for correction and the partial data adjacent thereto. The check matrix generation section 531 supplies the thus-generated check matrix to the second-code error detector-and-corrector 540, and the second-code error detector-and-corrector 540 corrects the combination of the target partial data for correction and the partial data adjacent thereto as one decoding unit with use of the check matrix.

Figure 22:
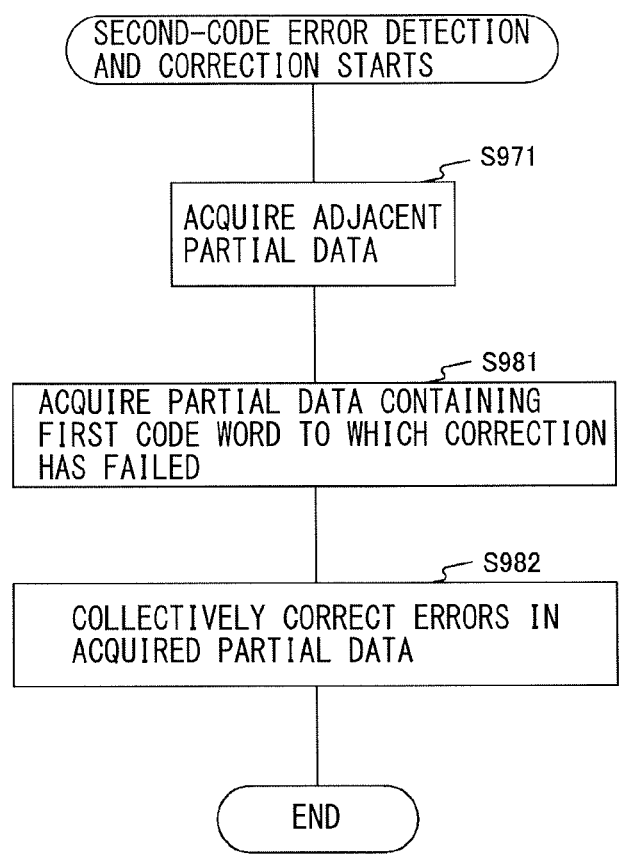
FIG. 22 is a flow chart illustrating an example of second-code error detection and correction according to a fourth modification example of the first embodiment.

FIG. 22 is a flow chart illustrating an example of second-code encoding error detection and correction according to the fourth modification example of the first embodiment. The second-code encoding error detection and correction according to the fourth modification example of the first embodiment differs from that according to the first embodiment in that steps S981 and S982 are executed, instead of the steps S972 and S973. In the fourth modification example, the memory controller 300 acquires adjacent partial data adjacent to the first code word in which an error is detected (step S971), and acquires partial data containing the first code word in which the error is detected (step S981). Then, the memory controller 300 collectively performs error correction to these acquired partial data (step S982).

Fifth Modification Example

Figure 23:
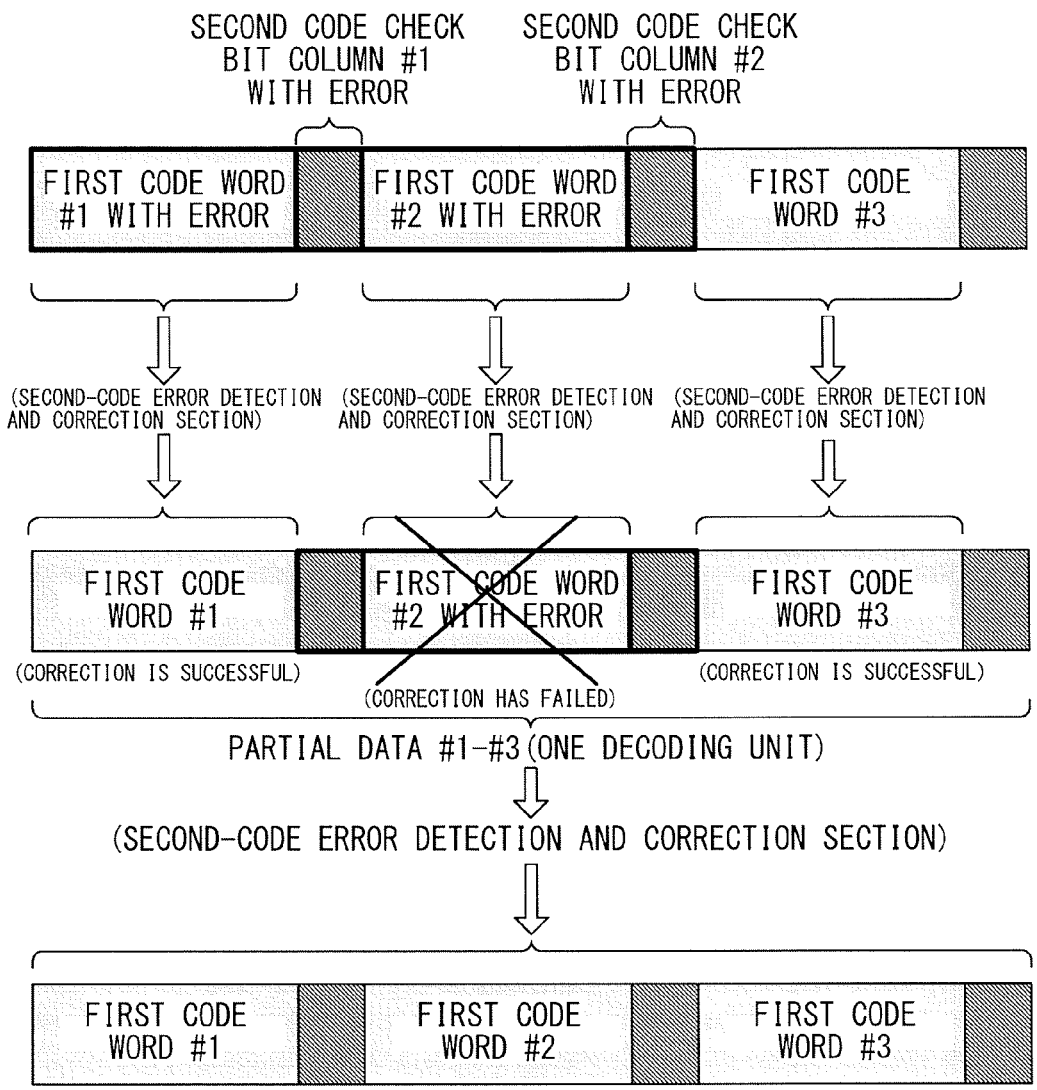
FIG. 23 is a diagram for describing a method of correcting the second code according to a fifth modification example of the first embodiment.

FIG. 23 is a diagram for describing a method of correcting the second code according to a fifth modification example of the first embodiment. For example, a case is considered where a second code containing the first code words #1, #2, and #3 is corrected. The first code word #2 of these first code words has an uncorrectable number of errors.

The first-code error detection and correction section 520 corrects the errors in the respective first code words #1, #2, and #3. In this correction, the first-code error detection and correction section 520 fails correction to the first code word #2 with the uncorrectable number of errors.

In this case, the second-code error detection and correction section 530 collectively corrects the first code word #2 to which correction has failed and the partial data #1 and #3 adjacent thereto. The error in the first code word #2 is corrected by correction to these partial data. In a method in which the adjacent partial data (#1 and #3) are corrected, and then the target partial data (#2) for correction is corrected, in a case where error correction to the adjacent partial data has failed, the second parity with an error in the adjacent partial data may be used for correction to the target partial data for correction.

On the other hand, in the fifth modification example, the adjacent partial data and the target partial data for correction are collectively corrected; therefore, possibility that error correction is performed with use of a parity with an error is eliminated, and error correction capability is improved.

2. Second Embodiment

Configuration Example of Second-Code Error Detection and Correction Section

Figure 24:
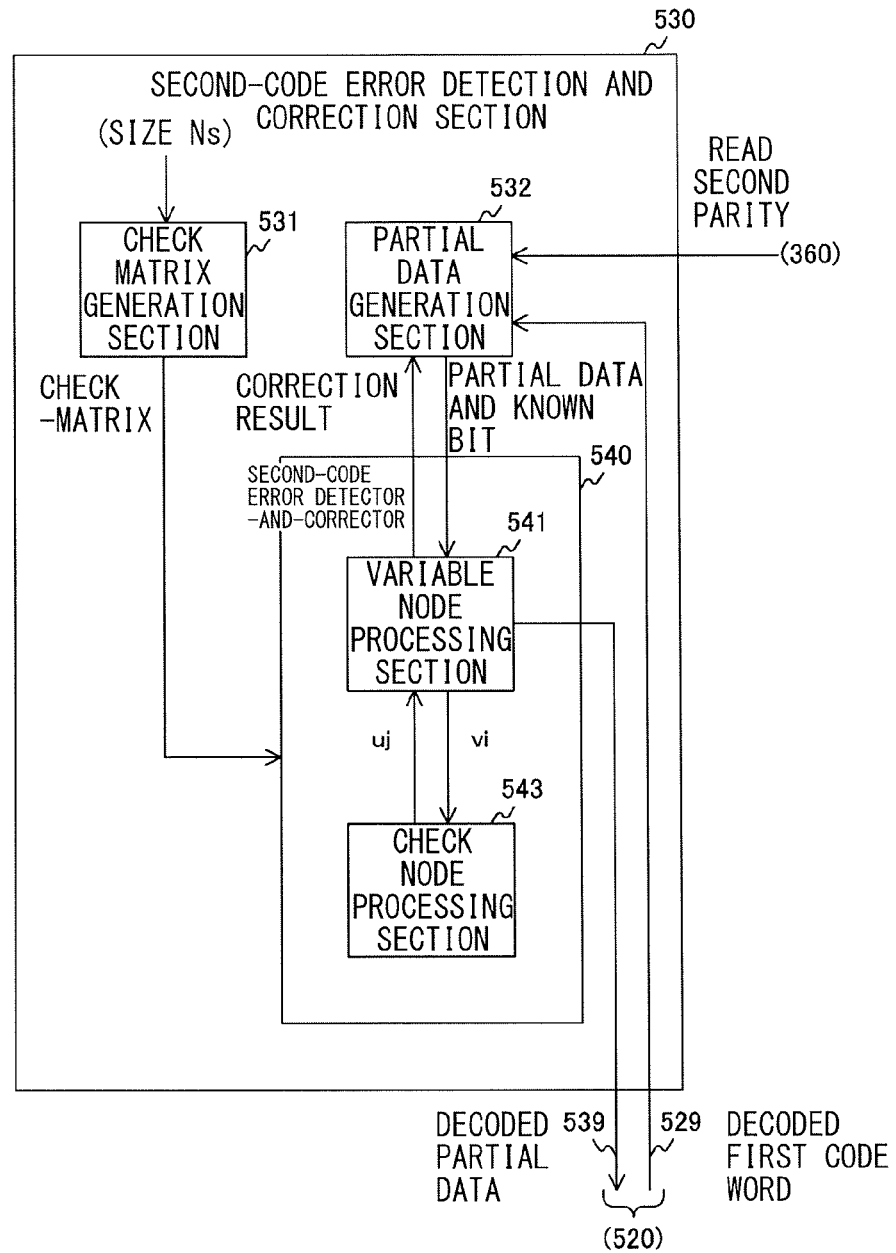
FIG. 24 is a block diagram illustrating a configuration example of a second-code error detection and correction section according to a second embodiment.

FIG. 24 is a block diagram illustrating a configuration example of the second-code error detection and correction section 530 according to a second embodiment. In the first embodiment, the second-code error detection and correction section 530 corrects an error in target partial data for correction, based on partial data adjacent thereto irrespective of a result of correction to the partial data adjacent thereto. However, in a case where the correction to the partial data adjacent thereto has failed, when error correction to the target partial data for correction is performed, based on the partial data adjacent thereto to which the correction has failed, possibility that the correction to the target partial data fails is increased. Therefore, in a case where the correction to the partial data adjacent thereto has failed, it may be preferable to use a correction method in which an error in partial data adjacent to the partial data adjacent to the target partial data is corrected and adjacent partial data are traced back until correction is successful. The second-code error detection and correction section 530 according to the second embodiment differs from that according to the first embodiment in that adjacent partial data are traced back until correction is successful.

More specifically, in the second-code error detector-and-corrector 540 according to the second embodiment, the variable node processing section 541 outputs, to the partial data generation section 532, a correction result indicating whether or not correction to partial data has failed. For example, in a case where messages are exchanged a fixed number of times, when an absolute value of a log-likelihood ratio of one of bits does not exceed a threshold value, it may be determined that correction has failed. In a case where correction to the adjacent partial data has failed, based on the correction result, the partial data generation section 532 acquires, as new adjacent partial data, partial data adjacent to the adjacent partial data, and outputs the new adjacent partial data to the variable node processing section 541. It is to be noted that, in the second embodiment, as with the first embodiment, the second code is not limited to the spatially-coupled LDPC code. For example, instead of the spatially-coupled LDPC code, a convolution code or a turbo code which will be described later may be used. Moreover, the second-code encoding section 420 may use a higher-than-binary code as the second code. This is also applicable to respective modification examples of the second embodiment.

Operation Example of Memory Controller

Figure 25:
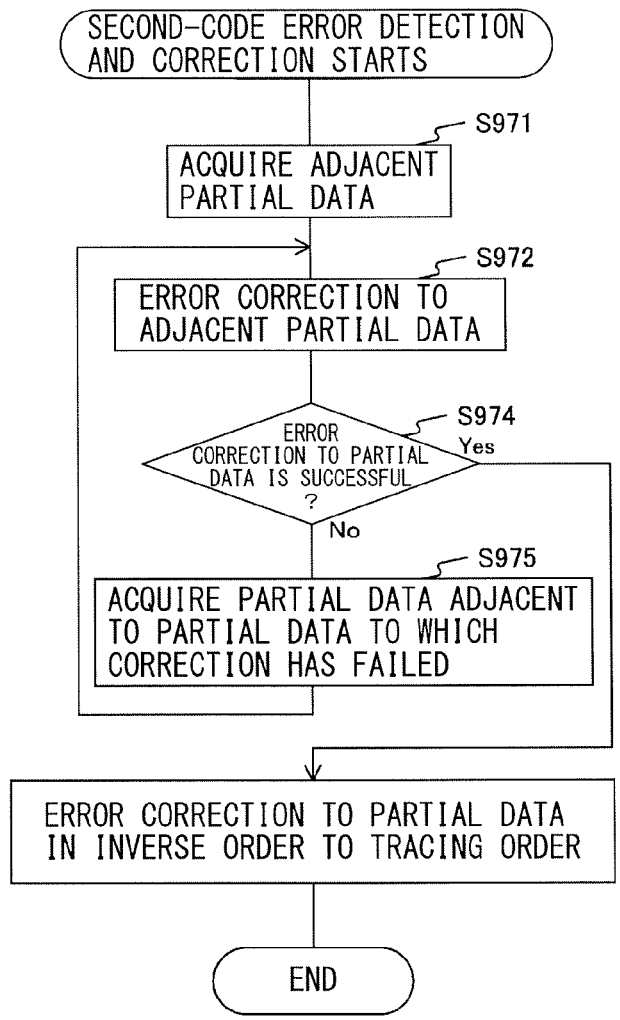
FIG. 25 is a flow chart illustrating an example of second-code error detection and correction according to the second embodiment.

FIG. 25 is a flow chart illustrating an example of second-code error detection and correction according to the second embodiment. The second-code error detection and correction according to the second embodiment differs from that according to the first embodiment in that steps S974, S975, and S977 are further executed.

The memory controller 300 corrects adjacent partial data adjacent to the first code word in which an error is detected (step S972), and determines whether or not the correction is successful (step S974). In a case where the correction has failed (step S974: No), the memory controller 300 acquires, as new adjacent partial data, partial data adjacent to the adjacent partial data to which the correction has failed (step S975), and returns to the step S972. On the other hand, in a case where the correction is successful (step S974: Yes), the memory controller 300 sequentially corrects partial data in inverse order to tracing order, and corrects target partial data for correction in which an error is detected (step S977). After the step S977, the memory controller 300 terminates the second-code error detection and correction.

Figure 26:
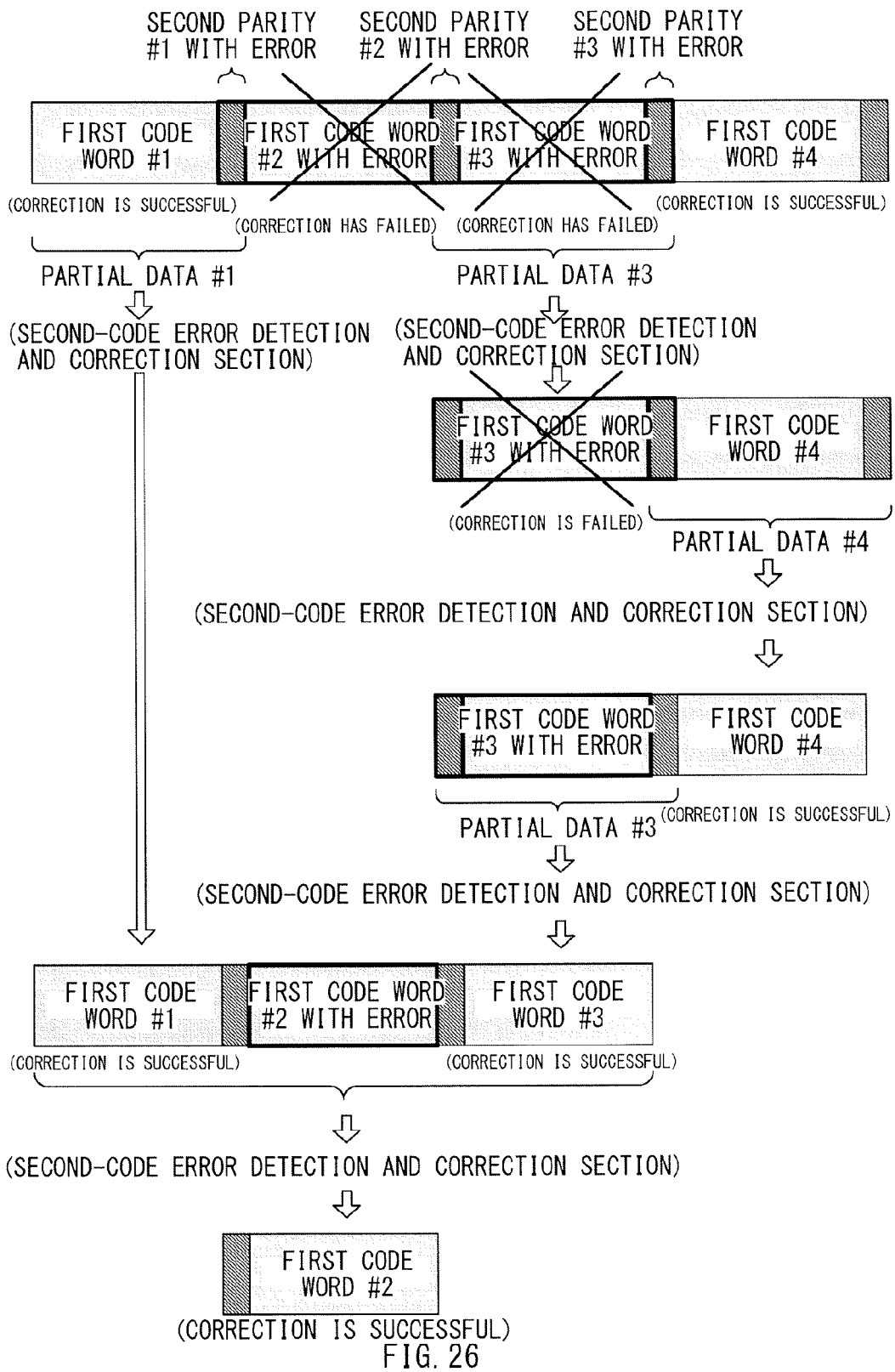
FIG. 26 is a diagram for describing a method of correcting a second code according to the second embodiment.

FIG. 26 is a diagram for describing a method of correcting the second code according to the second embodiment. For example, a case is considered where an error in the second code containing the first code words #1 to #4 is corrected. The first code words #2 and #3 of these first code words each have an uncorrectable number by the first-code error detection and correction section 520 of errors. Each of second parities #1, #2, and #3 generated corresponding to respective first code words also has an error.

The first-code error detection and correction section 520 corrects the errors in the respective first code words #1 to #4. In this correction, the first-code error detection and correction section 520 fails the correction to the first code words #2 and #3 with the uncorrectable number of errors.

The second-code error detection and correction section 530 corrects the errors in the partial data #1 and #3 adjacent to the first code word #2 to which the correction has failed. It is assumed that the second-code error detection and correction section 530 succeeds in correction to the partial data #1 containing the first code word #1 without error, but fails the correction to the partial data #3 containing the first code word #3 with the error. In this case, the second-code error detection and correction section 530 corrects the error in the partial data #4 adjacent to the partial data #3 to which the correction has failed.

When the correction to the partial data #4 is successful, the second-code error detection and correction section 530 corrects the error in the partial data #3 to which the correction has failed. Since the error in the second parity #3 is corrected by correction to the partial data #4, the partial data #3 containing the second parity #3 is allowed to be accurately corrected. In a case where the correction to the partial data #3 is successful, the second-code error detection and correction section 530 corrects the error in the partial data #2 to which the correction has failed. Since the error in the second parity #2 is corrected by the correction to the partial data #3, the partial data #2 containing the second parity #2 is allowed to be accurately corrected.

Thus, in the second embodiment, a detected error is allowed to be corrected, based on adjacent partial data to which correction is successful by tracing partial data back until correction to adjacent partial data is successful. Accordingly, an error in data is allowed to be corrected more accurately.

First Modification Example

In the second embodiment, adjacent partial data are traced back until correction is successful irrespective of a result of decoding of the first code word. However, in a case where correction to the first code word has failed, possibility that correction to partial data containing the first code word fails is high. Therefore, in a case where partial data are traced back, it may be preferable to skip over partial data containing the first code word to which correction has failed. The memory controller 300 according to a first modification example of the second embodiment differs from that according to the second embodiment in that the memory controller 300 traces partial data back while skipping over partial data containing the first code word to which correction has failed.

Figure 27:
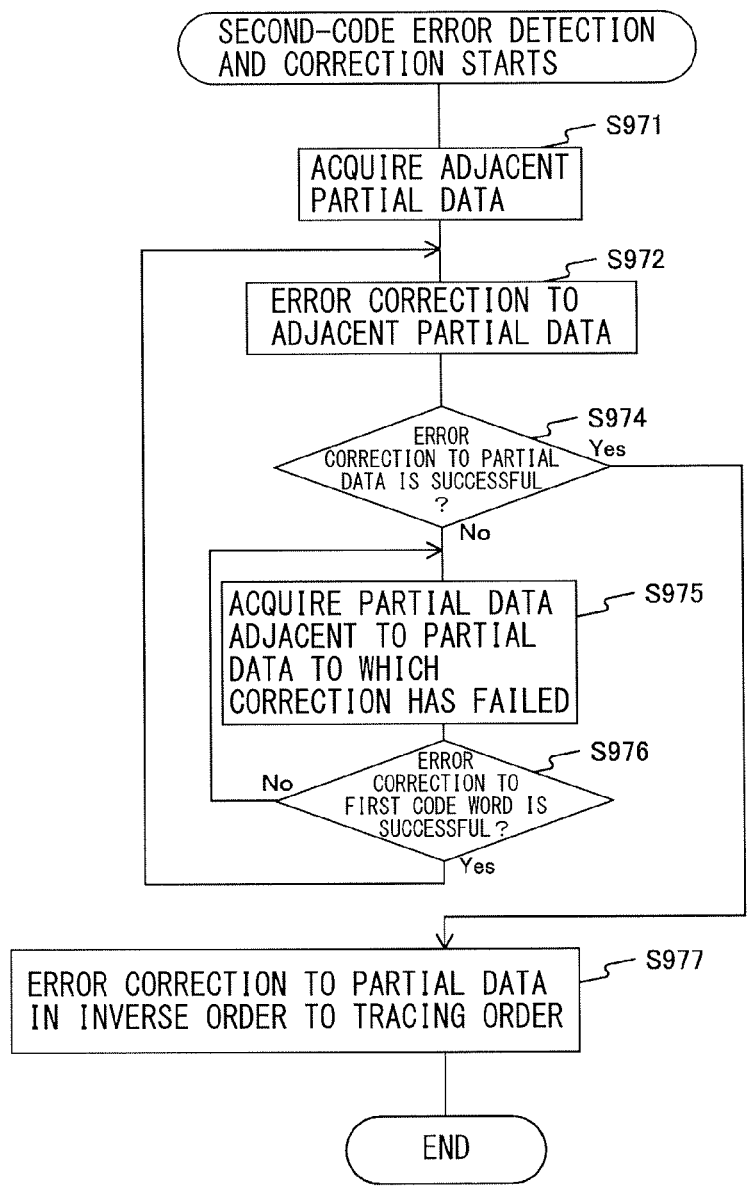
FIG. 27 is a flow chart illustrating an example of second-code error detection and correction according to a first modification example of the second embodiment.

FIG. 27 is a flow chart illustrating an example of second-code error detection and correction according to the first modification example of the second embodiment. The second-code error detection and correction according to the first modification example of the second embodiment differs from that according to the second embodiment in that step S976 is further executed.

In a case where error correction to partial data has failed (step S974: No), the memory controller 300 acquires partial data adjacent to the partial data to which the correction has failed (step S975). Then, the memory controller 300 determines, based on an error detection block notification, whether or not correction to the first code word contained in the adjacent partial data is successful (step S976). In a case where the correction to the first code word has failed (step S976: No), the memory controller 300 returns to the step S975, and acquires partial data adjacent to the partial data containing the first code word to which the correction has failed. On the other hand, in a case where the correction to the first code word is successful (step S976: Yes), the memory controller 300 returns to the step S972.

Figure 28:
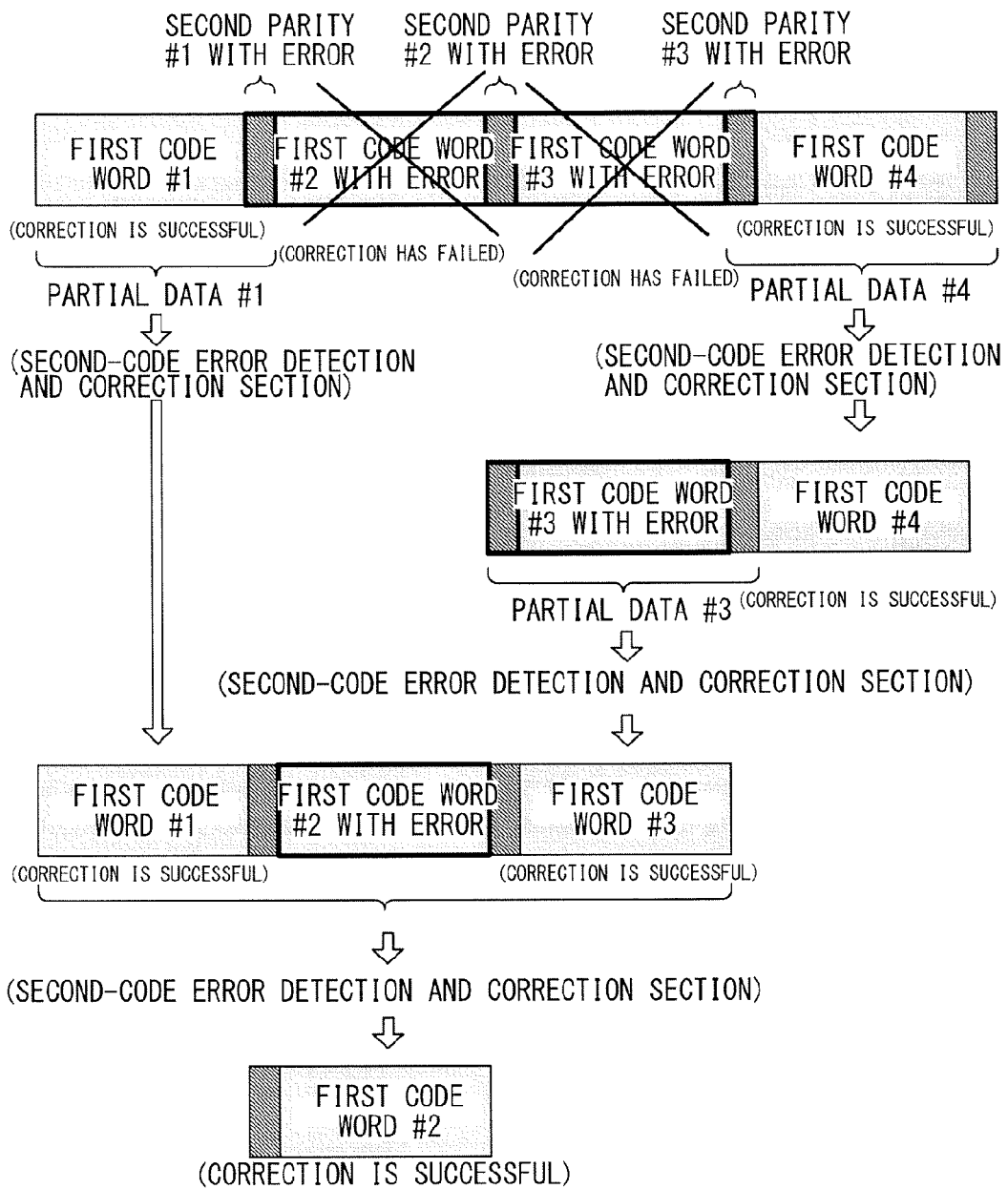
FIG. 28 is a diagram for describing a method of correcting the second code according to the first modification example of the second embodiment.

FIG. 28 is a diagram for describing a method of correcting the second code according to the first modification example of the second embodiment. For example, a case is considered where an error in the second code containing the first code words #1 to #4 is corrected. It is assumed that the first-code error detection and correction section 520 has failed correction to the first code words #2 and #3 with the uncorrectable number of errors.

The second-code error detection and correction section 530 determines, based on the error detection block notification, whether or not correction to the first code words #1 and #3 adjacent to the first code word #2 to which correction has failed is successful. The correction to the first code word #1 is successful, but the correction to the first code word #3 has failed; therefore, the second-code error detection and correction section 530 skips over the first code word #3 to which the correction has failed, and determines whether or not the correction to the first code word #4 adjacent to the first code word #3 is successful. Since the correction to the first code word #4 is successful, the second-code error detection and correction section 530 corrects the error in the partial data #4 containing the first code word #4.

Thus, the detected error is allowed to be corrected, based on partial data with high possibility of success of correction, by tracing adjacent partial data back while skipping over partial data containing the first code word to which correction has failed. Therefore, an error in data is allowed to be corrected more accurately.

Second Modification Example

In the second embodiment, when correction to adjacent partial data has failed, the memory controller 300 traces adjacent partial data back until correction is successful. However, to reliably correct data, it may be more preferable to decode the entire second code word than to decode a part of the second code word. A second modification example of the second embodiment differs from the second embodiment in that, when correction to adjacent partial data has failed, the memory controller 300 decodes the entire second code word.

Figure 29:
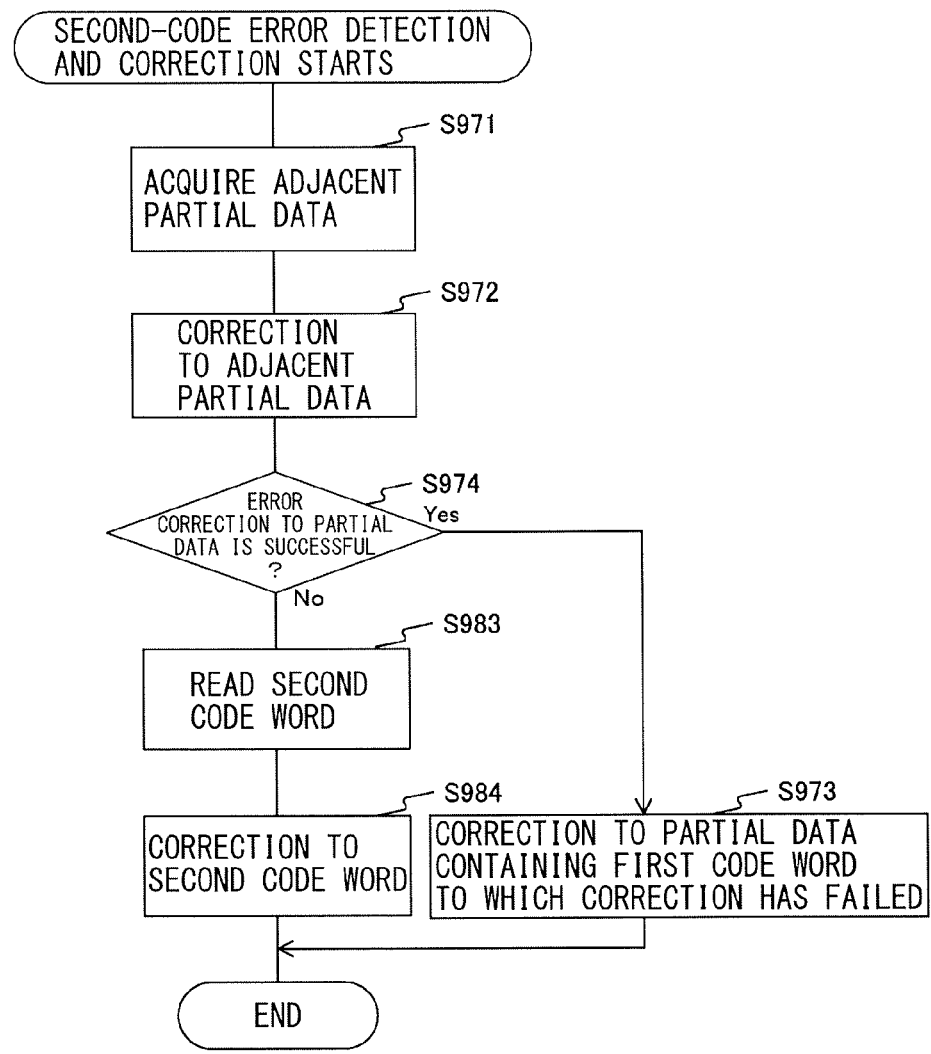
FIG. 29 is a flow chart illustrating an example of second-code error detection and correction according to a second modification example of the second embodiment.

FIG. 29 is a flow chart illustrating an example of second-code error detection and correction according to the second modification example of the second embodiment. The second-code error detection and correction according to the second modification example of the second embodiment differs from that according to the second embodiment in that steps S974, S983, and S984 are further executed.

The memory controller 300 corrects adjacent partial data adjacent to the first code word in which an error is detected (step S972), and determines whether or not the correction is successful (step S974). In a case where the correction has failed (step S974: No), the memory controller 300 reads the entire second code word (step S983), and corrects the error in the second code word (step S984). On the other hand, in a case where the correction is successful (step S974: Yes), the memory controller 300 executes the step S973. After the step S973 or the step S984, the memory controller 300 terminates the second-code error detection and correction.

3. Third Embodiment

Configuration Example of Second-Code Encoding Section

Figure 30:
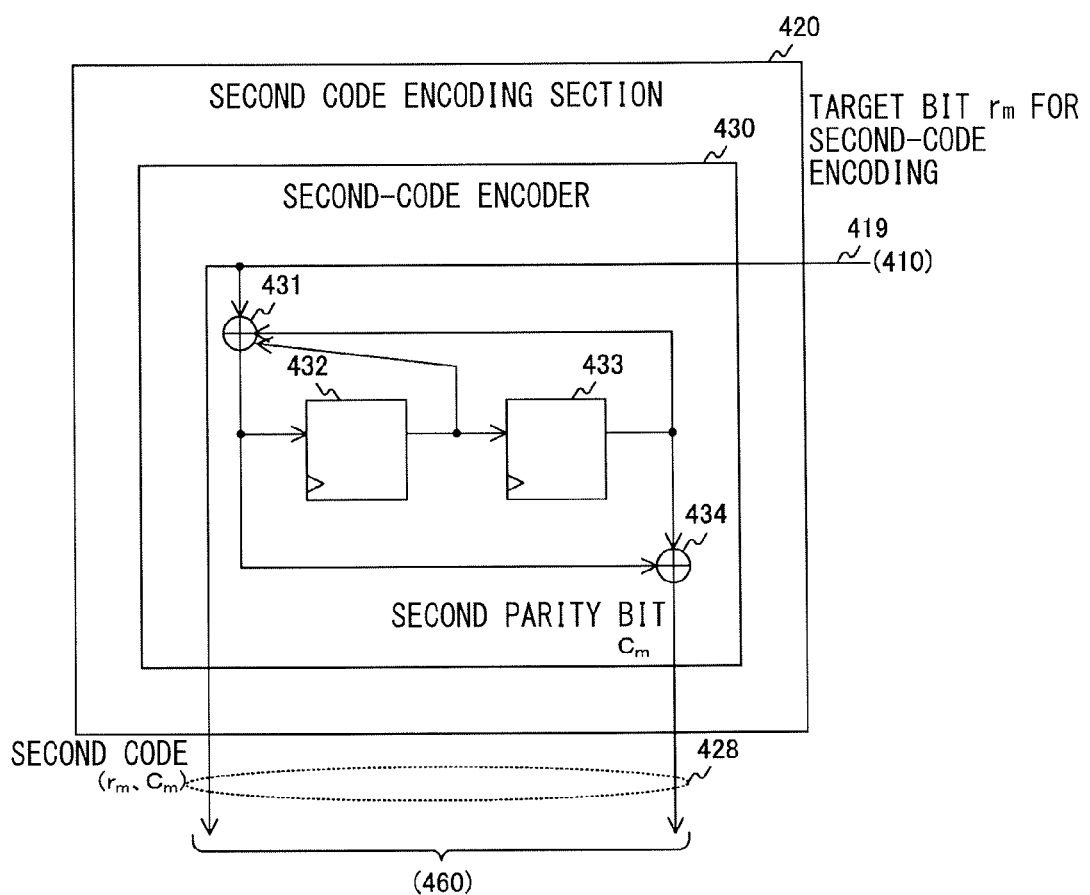
FIG. 30 is a block diagram illustrating a configuration example of a second-code encoding section according to a third embodiment.

In the first embodiment, the LDPC in which a part of data is common to partial data adjacent to each other is used as the second code; however, a convolution code may be used as the second code. The memory controller 300 according to a third embodiment differs from that according to the first embodiment in that a convolution code is used as the second code. FIG. 30 is a block diagram illustrating a configuration example of the second-code encoding section 420 according to the third embodiment. The second-code encoding section 420 according to the third embodiment differs from that according to the first embodiment in that a second-code encoder 430 is included, instead of the second-code encoder 423.

The second-code encoder 430 is configured to encode the first code word into the second code word with use of a convolution encoding system. The second-code encoder 430 may include, for example, half adders 431 and 434, and registers 432 and 433.

The half adder 431 is configured to output an exclusive-OR of input values. One of bits configuring the first code word is input to the half adder 431 as a target bit $r_m$ for second-code encoding, where "m" is an integer of 0 to Nf−1, and "Nf" is a code length of the first code word. Moreover, bits output from the registers 432 and 433 are input to the half adder 431. The half adder 431 outputs an exclusive-OR of the bits to the register 432 and the half adder 434.

The register 432 is configured to hold an output value from the half adder 431. The register 432 outputs a hold value to the register 433 and the half adder 431 in response to a predetermined clock signal. It is to be noted that an initial value of the value held by the register 432 may be set to, for example, "0".

The register 433 is configured to hold an output value from the register 432. The register 433 outputs the value to the half adders 431 and 434 in response to a predetermined clock signal. It is to be noted that an initial value of the value held by the register 433 may be set to, for example, "0".

The half adder 434 is configured to output an exclusive OR of input values. Bits output from the half adder 431 and the register 433 are input to the half adder 434. The half adder 434 outputs an exclusive-OR of the bits as a second parity bit $C_m$.

The second-code encoder 430 stores a code word containing the target bit $r_m$ for second-code encoding and the second parity bit $C_m$ as the second code word in the encoded-data buffer 460. A size Ns of partial data of the second code word generated by convolution encoding may be set to, for example, a divisor of the access unit of the non-volatile memory 600. It is to be noted that the size Ns of the partial data may be set to a multiple of the access unit of the non-volatile memory 600.

A result of a convolution operation with respect to a past target bit for second-code encoding and a present target bit for second-code encoding is output as a present second code check bit.

State Transition Diagram of Second-Code Encoding Section

Figure 31:
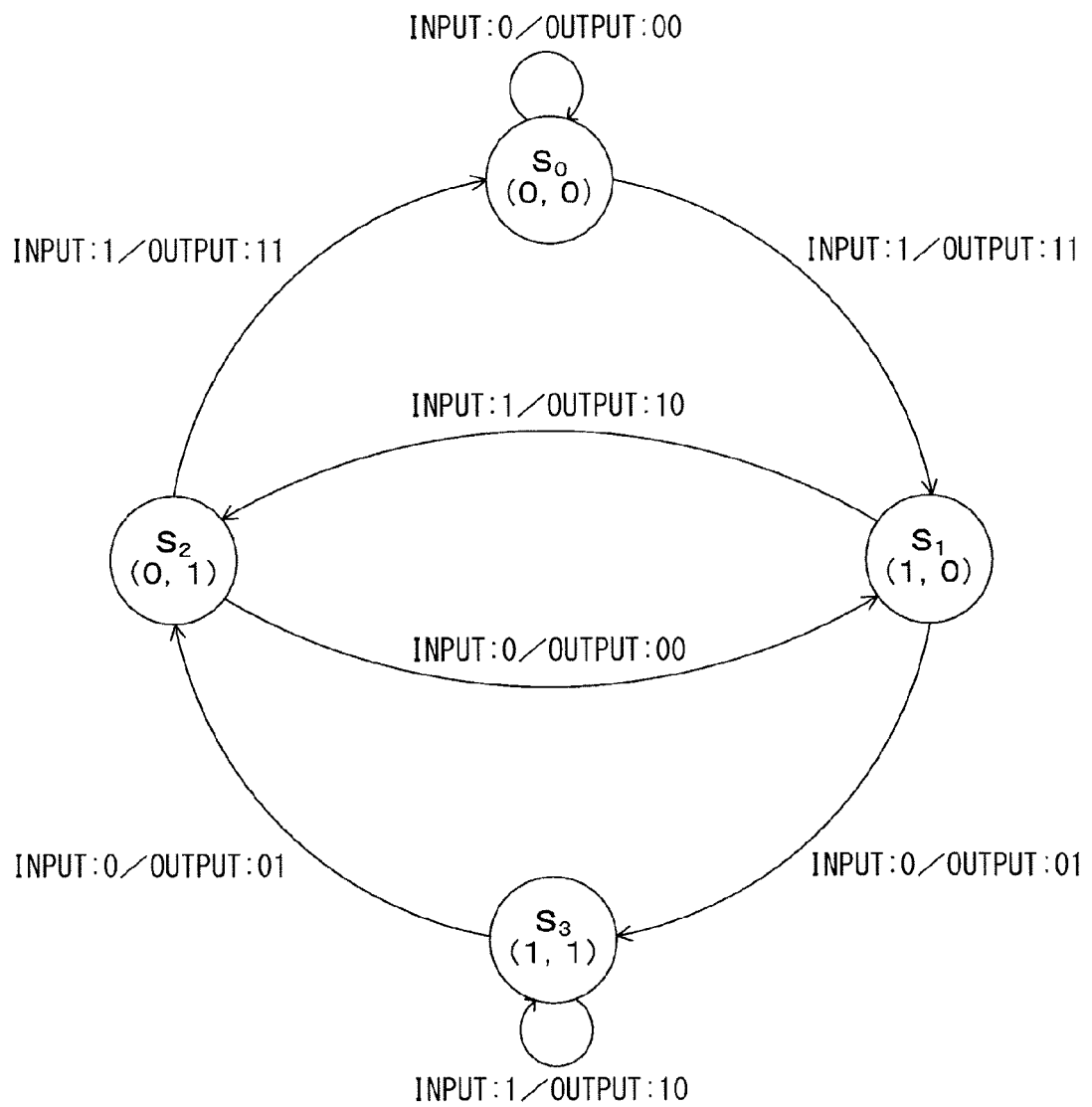
FIG. 31 is a state transition diagram illustrating an example of state transition of a second-code encoder according to the third embodiment.

FIG. 31 is a state transition diagram illustrating an example of state transition of the second-code encoder 430 according to the third embodiment. The second-code encoder 430 has four states including $S_0$, $S_1$, $S_2$, and $S_3$. $S_0$ is a state where the values held by the registers 432 and 433 are "00", and $S_1$ is a state where the values are "10". Moreover, $S_2$ is a state where the values held by the registers 432 and 433 are "01", and $S_3$ is a state where the values are "11".

The registers 432 and 433 may hold, for example, "00" as initial values; therefore, an initial state of the second-code encoder 430 may be set to $S_0$. It is to be noted that the initial state may be set to any of the states other than $S_0$.

In the state $S_0$, when the target bit $r_m$ for second-code encoding having a value "0" is input, the second-code encoder 430 performs a convolution operation in the configuration exemplified in FIG. 30, and determines "0" as the second parity bit $C_m$ by calculation. As a result, values "00" obtained by adding the input value "0" are output. The values held in the register 432 and 433 are still "00"; therefore, the second-code encoder 430 is still in the state $S_0$. On the other hand, when the value "1" is input in the state $S_0$, the second-code encoder 430 outputs values "11", and is transitioned to the state $S_1$.

When the value "0" is input in the state $S_1$, the second-code encoder 430 outputs values "01", and is transitioned to the state $S_3$. On the other hand, when the value "1" is input in the state $S_1$, the second-code encoder 430 outputs values "10", and is transitioned to the state $S_2$.

When the value "0" is input in the state $S_2$, the second-code encoder 430 outputs values "00", and is transitioned to the state $S_1$. On the other hand, when the value of "1" is input in the state $S_2$, the second-code encoder 430 outputs values "11", and is transitioned to the state $S_0$.

When the value "0" is input in the state $S_3$, the second-code encoder 430 outputs values "01", and is transitioned to the state $S_2$. On the other hand, when the value "1" is input in the state $S_3$, the second-code encoder 430 outputs values "10", and is maintained in the state $S_3$.

Thus, the second-code encoder 430 outputs a bit column configuring the second code and performs state transition, based on the input value and the present state in accordance with a certain regulation. Therefore, the second-code error detection and correction section 530 is allowed to correct an error in the second code, based on a state transition rule of the second-code encoder 430.

Figure 32:
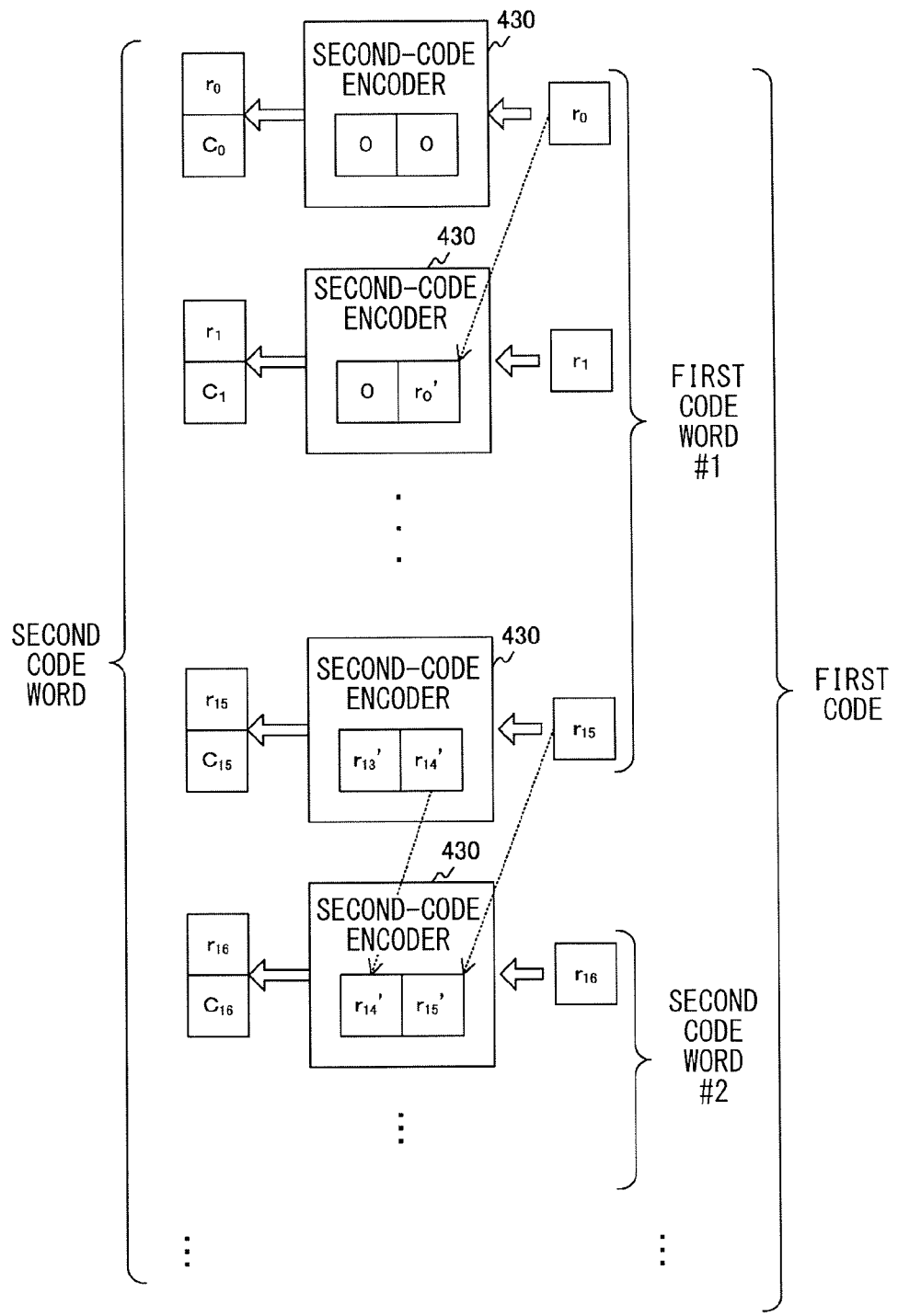
FIG. 32 is a diagram for describing an example of a method of generating a second code according to the third embodiment.

FIG. 32 is a diagram for describing an example of a method of generating the second code according to the third embodiment. When a first target bit $r_0$ for second-code encoding is input to the second-code encoder 430 holding the initial values "00", a first second parity bit $C_0$ generated by an operation with respect to $r_0$ and "00" is output together with the target bit $r_0$. Then, a register in a preceding stage of the second-code encoder 430 holds "$r_0$'" generated by the operation with respect to $r_0$ and the values "00".

Next, when a second target bit $r_1$ for second-code encoding is input, a second second parity bit $C_1$ generated by an operation with respect to $r_1$, $r_0'$, and "0" is output together with $r_1$. Then, a register in a following stage of the second-code encoder 430 holds "$r_0'''$" in the preceding stage, and the register in the preceding stage of the second-code encoder 430 holds "$r_1'''$" generated by an operation with respect to $r_1$ and the like.

Thus, a value of each data in the second code word is determined, based on a result of the convolution operation with respect to data in a preceding stage.

Configuration Example of Second-Code Error Detection and Correction Section

Figure 33:
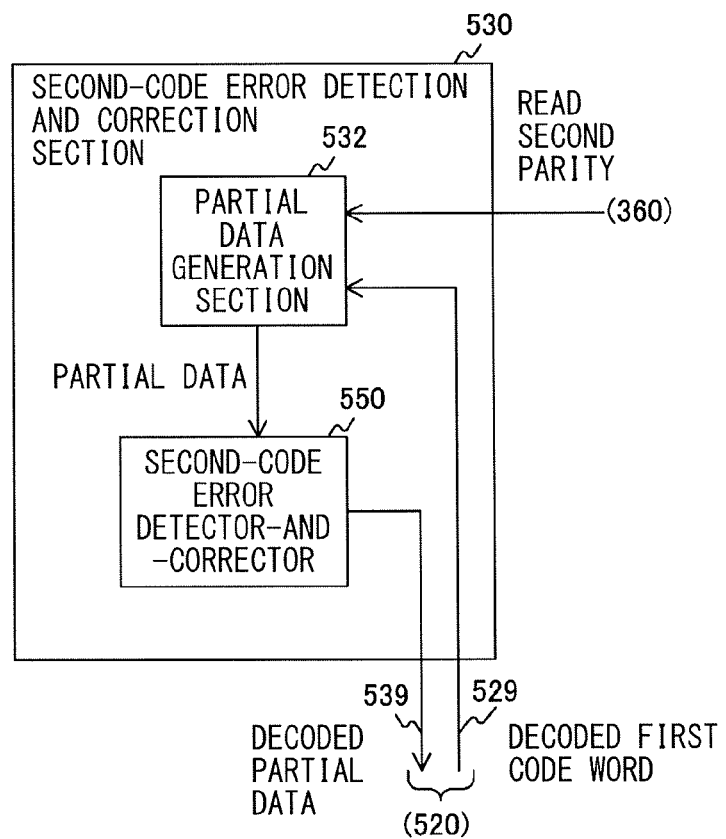
FIG. 33 is a block diagram illustrating a configuration example of a second-code error detection and correction section according to the third embodiment.

FIG. 33 is a block diagram illustrating a configuration example of the second-code error detection and correction section 530 according to the third embodiment. The second-code error detection and correction section 530 according to the third embodiment differs from that according to the first embodiment in that a second-code error detector-and-corrector 550 is included, instead of the check matrix generation section 531 and the second-code error detector-and-corrector 540.

The second-code error detector-and-corrector 550 is configured to correct an error in partial data, and may correct an error in partial data with use of, for example, a Viterbi algorithm.

In the Viterbi algorithm, in accordance with the state transition rule exemplified in FIG. 31, the states of the second-code encoder 430 are arranged in time-series order, and a path with a highest likelihood selected from trellis paths connecting these states is determined Hereinafter, the trellis path is simply referred to as "path". More specifically, a hamming distance between data generated in each of the paths and partial data read from the non-volatile memory 600 is determined by calculation, and a path with a shortest hamming distance (a path metric) is selected. Data generated in the selected path is output as data to which error correction has been made.

The second-code error detector-and-corrector 550 sections the states arranged in time-series order, based on the size of data, and corrects partial data with use of the Viterbi algorithm. The second-code error detector-and-corrector 550 first executes decoding of data adjacent to target partial data by the Viterbi algorithm, and then decodes the target partial data with use of the determined start-point or end-point state. More specifically, if adjacent partial data is partial data following target partial data for correction, the start-point state of the adjacent partial data is used to perform decoding of the target partial data, and if the adjacent partial data is partial data preceding the target partial data for correction, the end-point state of the adjacent partial data is used to decode the target partial data. Determining the start-point or the end-point state of the path (the trellis path) is referred to as "terminating a trellis". The search of a target path is narrowed by termination of the trellis; therefore, an error in data is allowed to be corrected more accurately.

The second-code error detector-and-corrector 550 may use any algorithm capable of correcting an error in convolutionally encoded data, other than the Viterbi algorithm.

Figure 34A:
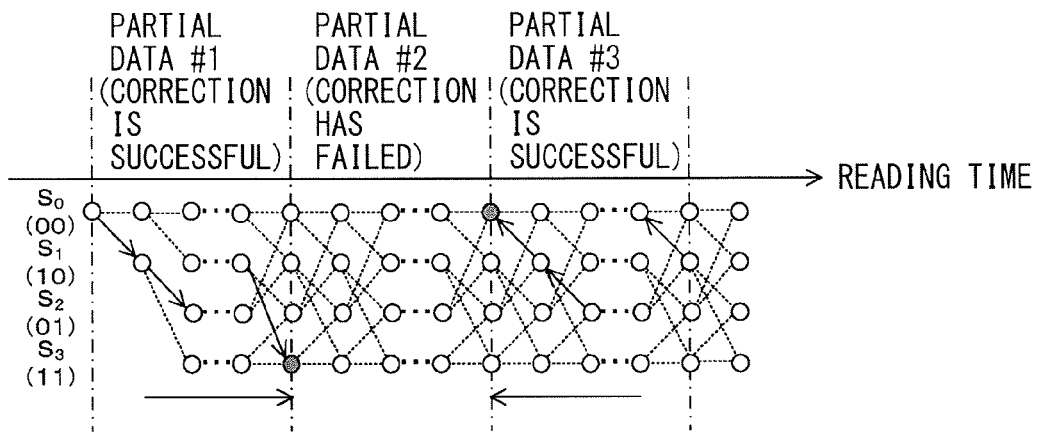
FIGS. 34A and 34B are examples of trellis diagrams illustrating state transition of a second-code encoding section according to the third embodiment.
Figure 34B:
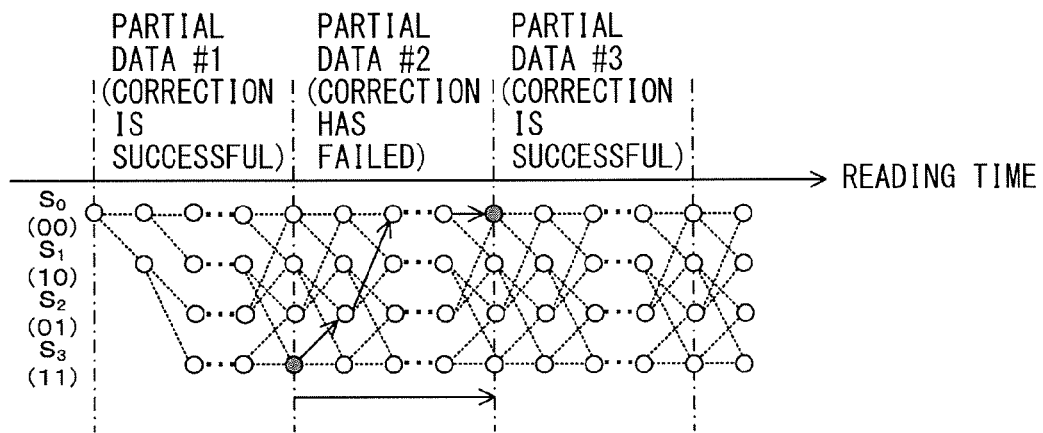

FIGS. 34A and 34B are examples of a trellis diagram illustrating an example of state transition of the second-code encoding section according to the third embodiment. A case is considered where partial data #1 to #3 are sequentially read from the non-volatile memory 600 and correction to the first code word contained in the partial data #2 has failed. It is assumed that correction to the first code words in the partial data #1 and #3 is successful. In FIGS. 34A and 34B, a horizontal axis indicates partial data reading time. A white circle mark indicates the state of the second-code encoder 430. A dotted line between states indicates a branch in the path, and a solid line indicates a branch in a path with a highest likelihood.

FIG. 34A illustrates an example of a trellis diagram before correction to the partial data #2. The memory controller 300 corrects the partial data #1 and #3 adjacent to the partial data #2 to which correction has failed with use of the Viterbi algorithm. The memory controller 300 determines the state $S_3$ at an end point of the partial data #1 and the state $S_0$ at a start point of the partial data #3, based on a correction result.

FIG. 34B illustrates an example of a trellis diagram at the time of correction to the partial data #2. The memory controller 300 terminates a trellis in correction to the partial data #2 at the end point $S_0$ determined in the correction to the partial data #1 as a start point and the start point $S_3$ determined in the correction to the partial data #3 as an end point. A shaded circle mark in FIG. 34B indicates a terminated state. The search of the path is narrowed by termination of the trellis; therefore, an error in data is allowed to be corrected more accurately.

Thus, in the third embodiment, the memory controller 300 is allowed to perform error correction with use of the convolution code as the second code. Therefore, in a system with use of the convolution encoding system, an error in data is allowed to be accurately corrected at high speed.

4. Fourth Embodiment

Configuration Example of Second-Code Encoding Section

In the first embodiment, the LDPC code in which a part of data is common to partial data adjacent to each other is used as the second code; however, a turbo code may be used as the second code. The memory controller 300 according to a fourth embodiment differs from that according to the first embodiment in that a turbo code is used as the second code.

Figure 35:
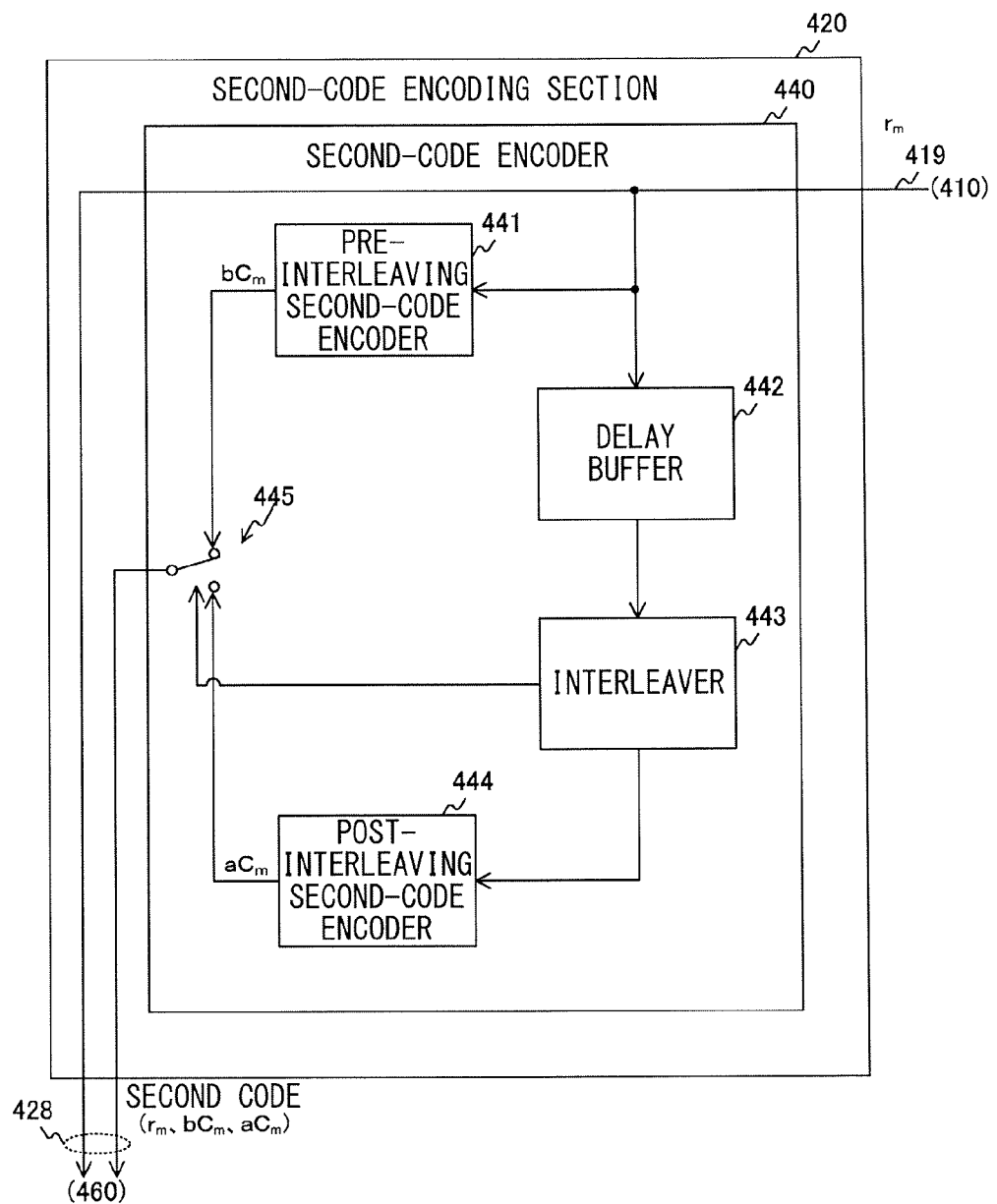
FIG. 35 is a block diagram illustrating a configuration example of a second-code encoding section according to a fourth embodiment.

FIG. 35 is a block diagram illustrating a configuration example of the second-code encoding section 420 according to the fourth embodiment. The second-code encoding section 420 according to the fourth embodiment differs from that according to the first embodiment in that a second-code encoder 440 is included, instead of the second-code encoding target data generation section 421 and the second-code encoder 423.

The second-code encoder 440 includes a pre-interleaving second-code encoder 441, a delay buffer 442, an interleaver 443, a post-interleaving second-code encoder 444, and a switch 445.

The pre-interleaving second-code encoder 441 is configured to encode target data for second-code encoding into the second code word with use of the convolution encoding system. The configuration of the pre-interleaving second-code encoder 441 may be similar to, for example, the second-code encoder 430 according to the third embodiment, except that the pre-interleaving second-code encoder 441 generates only a second code check bit. The pre-interleaving second-code encoder 441 outputs a generated second parity bit $bC_m$ to the switch 445, where "m" is an integer of 0 to Nf−1, and Nf is a code length of the first code word (i.e., the target data for second-code encoding).

The delay buffer 442 is configured to delay output of the target data for second-code encoding to the interleaver 443 until encoding in the pre-interleaving second-code encoder 441 is completed.

The interleaver 443 is configured to acquire the target data for second-code encoding through the delay buffer 442, and to perform interleaving of the target data for second-code encoding. Error correction capability with respect to a burst error is increased by this interleaving. When the interleaving is completed, the interleaver 443 controls the switch 445, and starts output of the second code check bit from the pre-interleaving second-code encoder 441. The interleaver 443 outputs the interleaved target data for second-code encoding to the post-interleaving second-code encoder 444.

The post-interleaving second-code encoder 444 is configured to encode the target data for second-code encoding in which data is interleaved into the second code word. The post-interleaving second-code encoder 444 outputs a generated second parity bit $aC_m$ to the switch 445.

The switch 445 outputs the second parity bit $bC_m$ or $aC_m$, based on control by the interleaver 443. The switch 445 outputs the second parity bit $bC_m$ from the pre-interleaving second-code encoder 441 before the interleaving, and outputs the second parity bit $aC_m$ from the post-interleaving second-code encoder 444 after the interleaving.

The second-code encoder 440 outputs, as the second code, a code containing the target bit $r_m$ for second-code encoding and the second parity bits $bC_m$ and $aC_m$ to the encoded-data buffer 460. The second parity bit $bC_m$ generated before the interleaving of data is used to decode a part or a whole of the second code. On the other hand, in a case where decoding of the part of the second code has failed, the second parity bit $aC_m$ generated after the interleaving of data is used to decode the entire second code.

Configuration Example of Second-Code Error Detection and Correction Section

Figure 36:
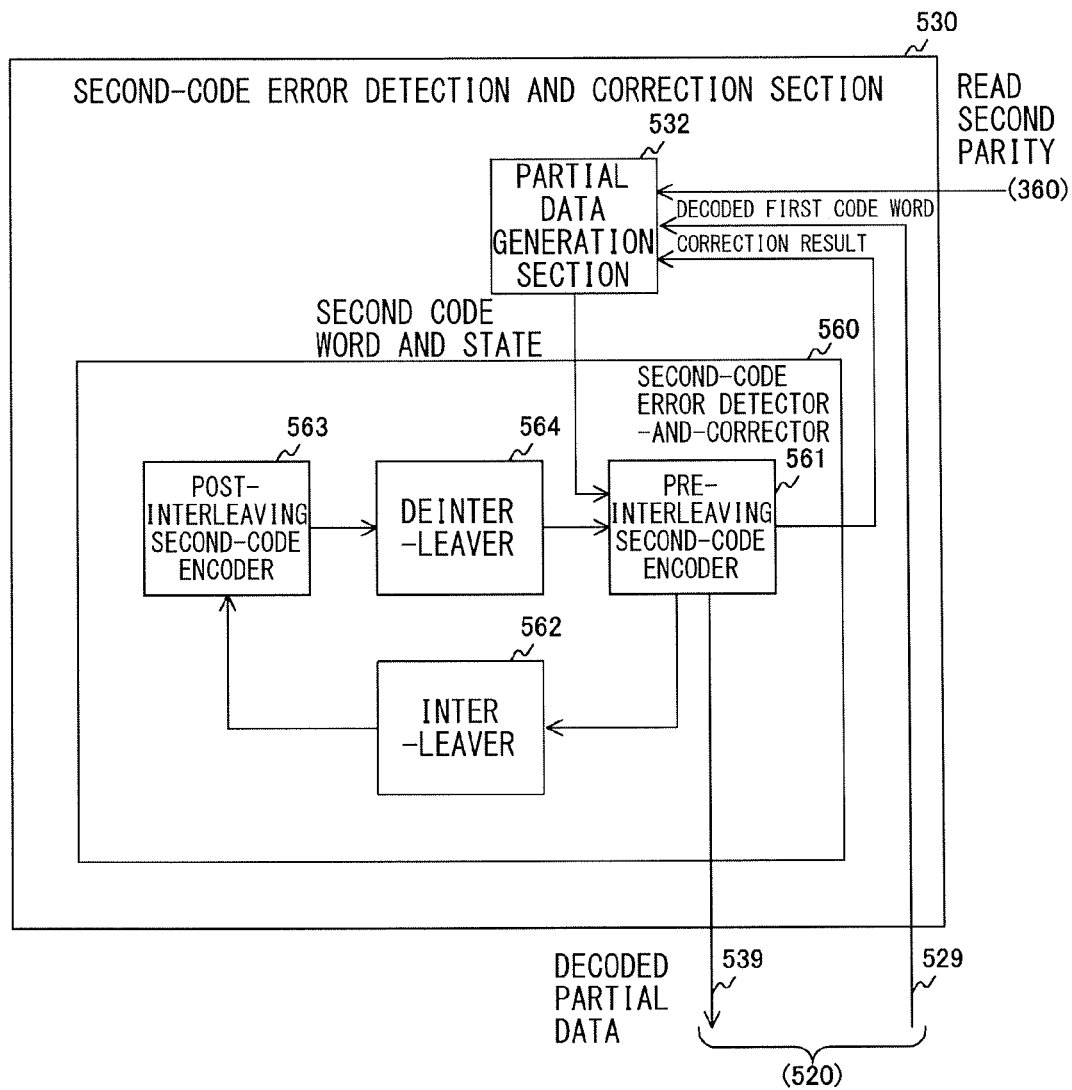
FIG. 36 is a block diagram illustrating a configuration example of a second-code error detection and correction section according to the fourth embodiment.

FIG. 36 is a block diagram illustrating a configuration example of the second-code error detection and correction section 530 according to the fourth embodiment. The second-code error detection and correction section 530 according to the fourth embodiment differs from that according to the first embodiment in that a second-code error detector-and-corrector 560 is included, instead of the check matrix generation section 531 and the second-code error detector-and-corrector 540.

The partial data generation section 532 according to the fourth embodiment generates partial data from the decoded first code word and the second parity, and supplies the partial data to the second-code error detector-and-corrector 560.

The second-code error detector-and-corrector 560 includes a pre-interleaving second-code corrector 561, an interleaver 562, a post-interleaving second-code corrector 563, and a deinterleaver 564.

The pre-interleaving second-code corrector 561 is configured to correct an error in the second code word in which data is not yet interleaved. The pre-interleaving second-code corrector 561 may correct an error in the second code word with use of, for example, a BCJR (Bahl Cocke Jelinek Raviv) algorithm.

In a case where the BCJR algorithm is used, the pre-interleaving second-code corrector 561 receives partial data from the partial data generation section 532, and receives prior information $Le(u_k)$ from the deinterleaver 564, where the prior information $Le(u_k)$ is a log-likelihood ratio of a kth symbol (for example, bit) $u_k$ determined by the pre-interleaving second-code corrector 563, "k" is an integer of 0 to Nt−1, and "Ns" is a size of target data for correction. It is to be noted that the prior information $Le(u_k)$ is not determined in an initial state; therefore, the prior information $Le(u_k)$ is set to a predetermined initial value (for example, "0"). Moreover, the target data for correction may be partial data of the second code word or the entire second code word.

The pre-interleaving second-code corrector 561 takes the target bit $r_m$ for second-code encoding and the second parity bit $bC_m$ generated before interleaving from the received data. Then, the pre-interleaving second-code corrector 561 determines preceding-state passage probability $\alpha_k(s)$ by calculation with use of the following expression 13, where "s" is a state of the pre-interleaving second-code encoder 441. Moreover, the preceding-state passage probability $\alpha_k(s)$ is probability that a kth state is turned to the state "s" through passage of respective 0th to k−1th states.

[Math. 13]

$$\alpha_k(s) = \sum_{s'} \gamma_k(s', s) \cdot \alpha_{k-1}(s') \qquad \text{Expression 13}$$

In the expression 13, γk(s', s) is probability of transition from a state "s'" to the state "s", and is determined by the following expression 14.

[Math. 14]

$$\gamma_k(s,s') = P(u_k) \cdot p(r_k | u_k) \qquad \text{Expression 14}$$

In the expression 14, $P(u_k)$ is determined by the following expression 15 with use of the prior information $Le(u_k)$. Moreover, $p(r_k|u_k)$ is probability of dependence on a communication channel from the encoded-data supply section 470 to the first-code error detection and correction section 520 or the second-code error detection and correction section 560, and is determined by the following expression 16.

[Math. 15]

$$P(u_k) = \left( \frac{e^{-Le(u_k)/2}}{1 + e^{-Le(u_k)}} \right) \cdot e^{(u_k - \frac{1}{2})Le(u_k)} \qquad \text{Expression 15}$$

[Math. 16]

$$p(r_k | u_k) = \prod_i \frac{1}{\sqrt{\pi \cdot N_0 / Es}} e^{-\frac{Es}{N_0}(r_k - u_k)^2} \qquad \text{Expression 16}$$

In the expression 18, Es is energy of a signal per bit in the communication channel from the encoded-data supply section 470 to the first-code error detection and correction section 520 or the second-code error detection and correction section 560 and a unit of Es may be, for example, joule (J), and $N_0$ is noise power density of the communication channel and a unit of $N_0$ may be, for example, watt/hertz (W/Hz). $Es/N_0$ may be determined by calculation with, for example, an additive white Gaussian noise (AWGN) communication channel in mind.

If a start-point state is received from the partial data generation section 532, the pre-interleaving second-code corrector 561 terminates a trellis, based on the state. For example, in the expression 14, the probability of γ(s', s) in which "s'" corresponding to the start-point state is maximized.

Moreover, the pre-interleaving second-code corrector 561 determines following-state passage probability $\beta_k(s)$ by calculation with use of the following expression 17, where the following-state passage probability $\beta_k(s)$ is probability that the kth state is turned to the state "s" through passage of respective Ns–1th to k+1th states, where the Ns–1th state is a state at an end.

[Math. 17]

$$\beta_k(s) = \sum_{s'} \gamma_{k+1}(s', s) \cdot \beta_{k+1}(s') \qquad \text{Expression 17}$$

If an end-point state is received from the partial data generation section 532, the pre-interleaving second-code corrector 561 terminates a trellis, based on the state. For example, in the expression 17, probability of γ(s', s) in which "s'" corresponds to the end-point state is maximized.

Then, the pre-interleaving second-code corrector 561 determines a log-likelihood ratio Λ($u_k$) from calculation results of the expressions 13, 14, and 17 by calculation with use of the following expression 18.

[Math. 18]

$$\Lambda(u_k) = \ln \frac{\sum_{(s',s)|u_k=1} \alpha_k(s')\gamma(s', s)\beta_k(s)}{\sum_{(s',s)|u_k=0} \alpha_k(s')\gamma(s', s)\beta_k(s)} \qquad \text{Expression 18}$$

Next, the pre-interleaving second-code corrector 561 determines whether or not a predetermined termination condition is satisfied, and in a case where the termination condition is satisfied, a value of a bit $u_k$ of corrected data is determined, based on the determined log-likelihood ratio Λ($u_k$), and is output to the decoded-data buffer 570 and the partial data generation section 532. For example, when the number of times information is exchanged between the pre-interleaving second-code corrector 561 and the post-interleaving second-code corrector 563 exceeds a predetermined number of times or when an absolute value of the log-likelihood ratio Λ($u_k$) exceeds a threshold value, it may be determined that the termination condition is satisfied. However, in a case where a part of the second code is decoded, information is not exchanged between the pre-interleaving second-code corrector 561 and the post-interleaving second-code corrector 563; therefore, when the absolute value of the log-likelihood ratio exceeds the threshold value, the termination condition is satisfied. The value of the corrected bit $u_k$ may be determined to "1" in a case where the log-likelihood ratio Λ($u_k$) is a positive value, and the value of the corrected bit $u_k$ may be determined to "0" in a case where the log-likelihood ratio Λ($u_k$) is a negative value.

On the other hand, in a case where the termination condition is not satisfied, the pre-interleaving second-code corrector 561 determines whether or not the entire partial data has been received. In a case where the entire partial data (i.e., the second code word) has not been received and a part of the second code is decoded, the pre-interleaving second-code corrector 561 generates a correction result indicating that correction has failed, and outputs the correction result to the partial data generation section 532. On the other hand, in a case where the entire partial data (second code word) has been received, the pre-interleaving second-code corrector 561 determines external information L($u_k$) from the second code word received from the partial data generation section 532 and the log-likelihood ratio Λ($u_k$) by calculation with use of the following expressions 19 and 20. The pre-interleaving second-code corrector 561 outputs, to the interleaver 562, the determined external information L($u_k$) together with the received second code word.

[Math. 19]

$$L(u_k) = \Lambda(u_k) - L_e(u_k) - L_{ch}(u_k) \qquad \text{Expression 19}$$

[Math. 20]

$$L_{ck}(u_k) = \ln \frac{P(r_k|u_k=1)}{P(r_k|u_k=0)} \qquad \text{Expression 20}$$

The interleaver 562 is configured to randomly interleave the second code word and the external information L($u_k$) from the pre-interleaving second-code corrector 561. The interleaver 562 outputs, to the post-interleaving second-code corrector 563, the interleaved external information L($u_k$) as prior information in the post-interleaving second-code corrector 563 together with the interleaved second code word.

In a case where decoding has failed in the pre-interleaving second-code corrector 563, the pre-interleaving second-code corrector 563 reads the entire second code word, and performs decoding of the second code word. In a case where the entire second code word is read, a longer read time is necessary, compared to a case where a part of the second code word is read; therefore, reading of the entire second code word is performed only in a case where partial decoding has failed.

The post-interleaving second-code corrector 563 is configured to correct an error in the second code word in which data is interleaved. The post-interleaving second-code corrector 563 receives the prior information and the second code word from the interleaver 562, and takes the target bit $u_k$ for second-code encoding and the second parity bit a$C_k$ from the second code word. The post-interleaving second-code corrector 563 determines external information, based on the prior information and the second code word with use of a method similar to the method used in the pre-interleaving second-code corrector 561. The post-interleaving second-code corrector 563 outputs the external information and the second code word to the deinterleaver 564.

The deinterleaver 564 is configured to return the interleaved second code word and the interleaved external information to a state before interleaving. The deinterleaver 564 outputs, to the pre-interleaving second-code corrector 561, external information before the interleaving as external information in the pre-interleaving second-code corrector 561 together with the second code word before the interleaving.

Thus, in the fourth embodiment, an error in data is allowed to be corrected with use of, as the second code, the turbo code in which encoding is performed by interleaving data. Therefore, error correction capability with respect to the burst error is improved. Moreover, decoding of the entire second code is performed in a case where decoding of a part of the second code has failed; therefore, error correction capability is improved, compared to a case where only partial decoding is performed.

5. Fifth Embodiment

Configuration Example of Second-Code Encoding Section

In the first embodiment, the memory controller 300 does not generate a parity with respect to the second parity. However, the memory controller 300 may further generate a parity with respect to the second parity to correct an error in the second parity. The memory controller 300 according to a fifth embodiment differs from that according to the first embodiment in that the parity with respect to the second parity is further generated. It is to be noted that, in the second to fourth embodiments, the parity with respect to the second parity may be further generated.

Figure 37:
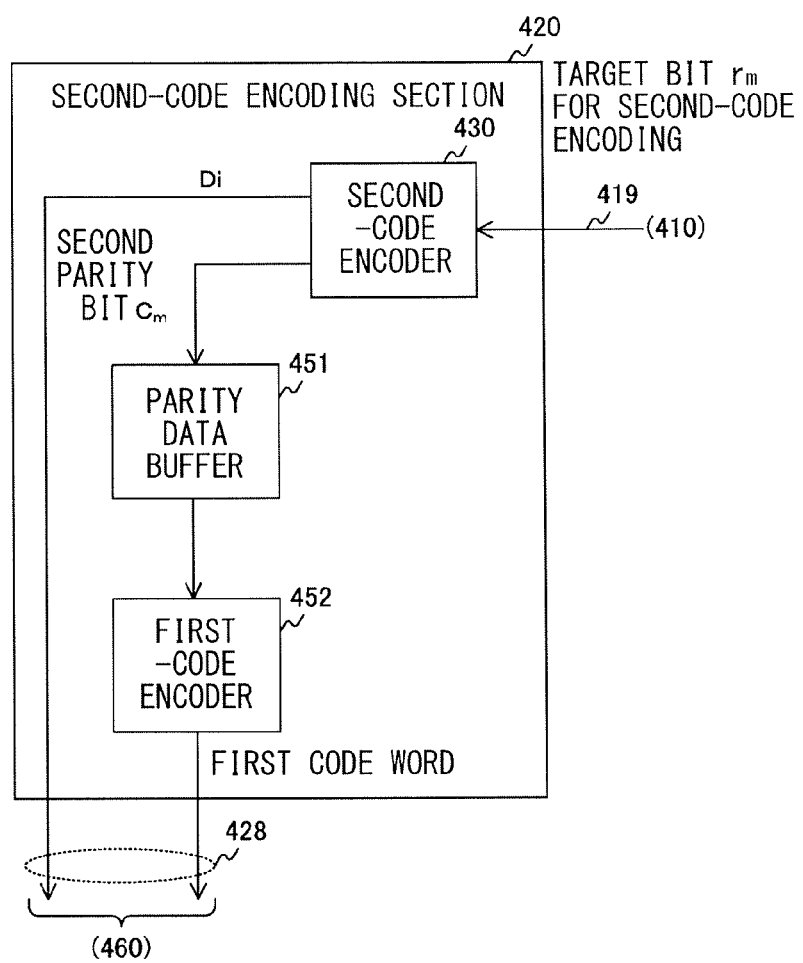
FIG. 37 is a block diagram illustrating a configuration example of a second-code encoding section according to a fifth embodiment.

FIG. 37 is a block diagram illustrating a configuration example of the second-code encoding section 420 according to the fifth embodiment. The second-code encoding section 420 according to the fifth embodiment differs from that according to the third embodiment exemplified in FIG. 30 in that a parity data buffer 541 and a first-code encoder 452 are further included.

The parity data buffer 451 is configured to hold each second parity as second parity data. The first-code encoder 452 is configured to encode the second parity data held by the parity data buffer 451 into the first code word. The first-code encoder 452 stores the generated first code word in the encoded-data buffer 460.

Figure 38:
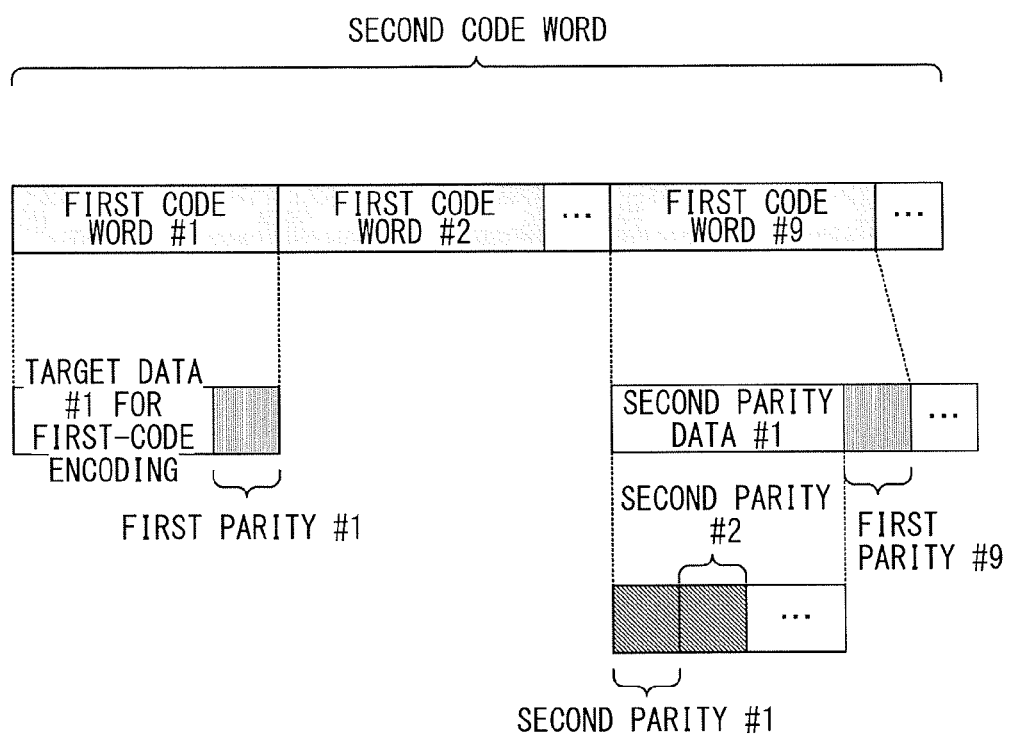
FIG. 38 is a diagram illustrating an example of a data structure of a second code according to the fifth embodiment.

FIG. 38 is a diagram illustrating an example of a data structure of the second code according to the fifth embodiment. The second code contains a plurality of first code words. Some first code words of these first code words are encoded target data for first-code encoding, and the remaining first code words are encoded second parity data. For example, the first code words #1 to #8 may be encoded target data for first-code encoding, and the first code word #9 may be encoded second parity data. The first code word #9 contains second parity data and a first parity #9. This second parity data may contain second parities #1 to #9 for error correction to the first code words #1 to #8.

Configuration Example of Second-Code Error Detection and Correction Section

Figure 39:
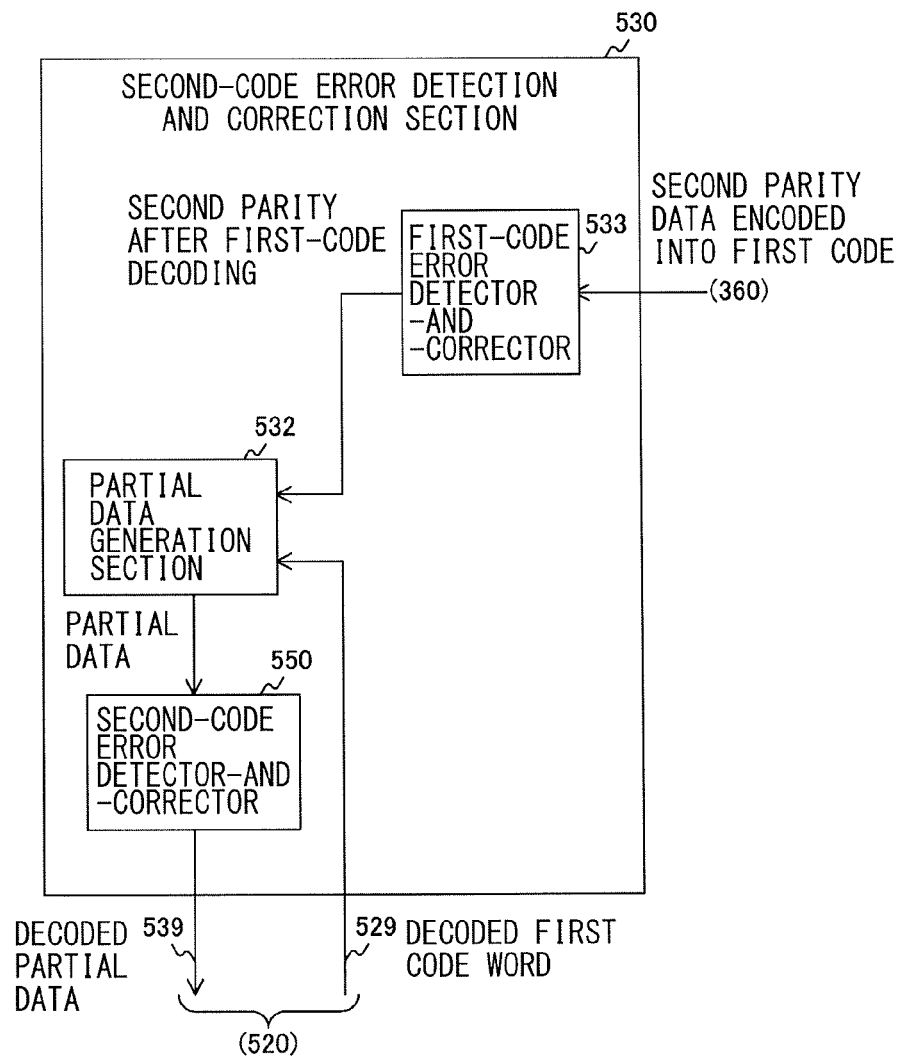
FIG. 39 is a block diagram illustrating a configuration example of a second-code error detection and correction section according to the fifth embodiment.

FIG. 39 is a block diagram illustrating a configuration example of the second code detection and correction section 530 according to the fifth embodiment. The configuration of the second-code error detection and correction section 530 according to the fifth embodiment differs from that according to the first embodiment in that a first-code error detector-and-corrector 533 is further included.

The first-code error detector-and-corrector 533 is configured to detect and correct an error in the second parity. More specifically, the first-code error detector-and-corrector 533 detects and corrects an error in the first code word containing the second parity in input adjacent partial data, and takes the second parity of the adjacent partial data from the first code word, and supplies the second parity to the partial data generation section 532. The partial data generation section 532 generates partial data from the decoded first code word and the second parity, and supplies the partial data to the second-code error detector-and-corrector 550.

Thus, in the fifth embodiment, the memory controller 300 is allowed to correct an error in the second parity; therefore, an error in data is allowed to be corrected more accurately.

6. Sixth Embodiment

Configuration Example of Second-Code Encoding Section

In the first embodiment, the memory controller 300 encodes data into the first code and the second code; however, the memory controller 300 may encode data into a code other than the first code and the second code. The memory controller 300 according to a sixth embodiment differs from that according to the first embodiment in that a code other than the first code and the second code is further generated.

Figure 40:
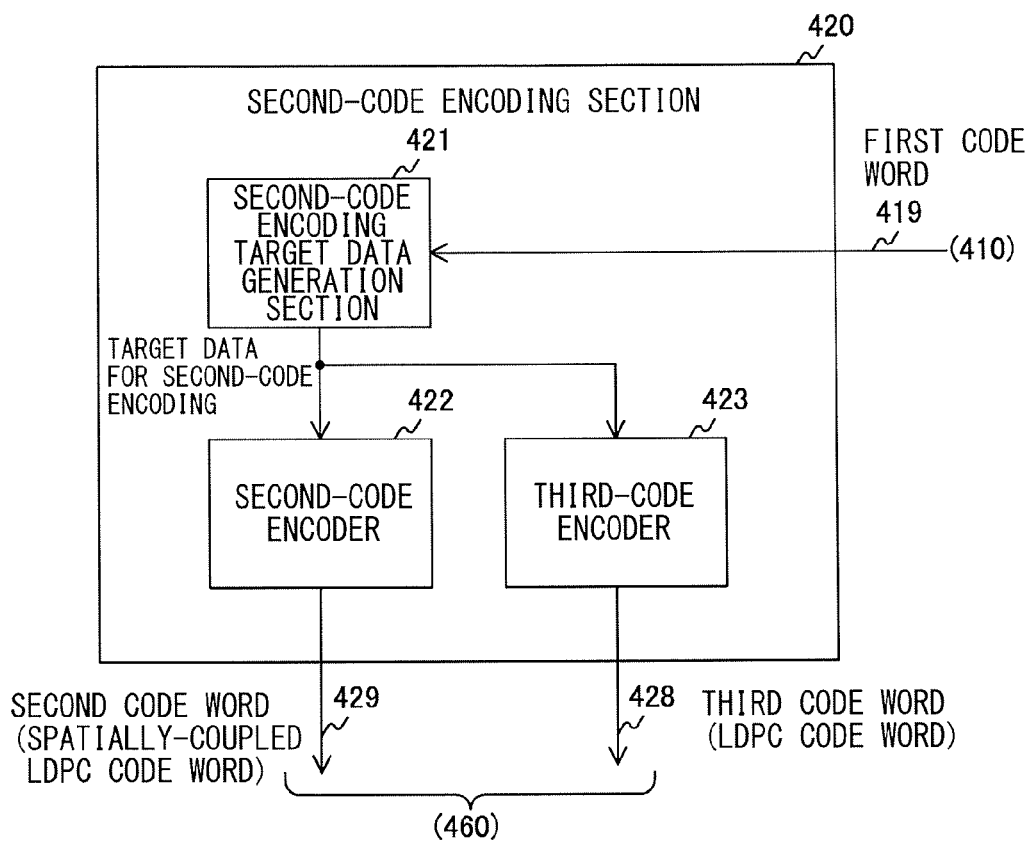
FIG. 40 is a block diagram illustrating a configuration example of a second-code encoding section according to a sixth embodiment.

FIG. 40 is a block diagram illustrating a configuration example of the second-code encoding section 420 according to the sixth embodiment. The second-code encoding section 420 according to the sixth embodiment differs from that according to the first embodiment in that a third-code encoder 423 is further included. The third-code encoder 423 is configured to encode target data for second-code encoding into a third code. It is assumed that the second-code encoder 422 and the third-code encoder 423 hold a generator matrix.

The third code is a code that is not allowed to be partially decoded, unlike the second code. In a case where the second code is a spatially-coupled LDPC code, for example, a normal LDPC code may be used as the third code. In a common error detector-and-corrector, these codes are allowed to be decoded with use of the spatially-coupled LDPC code and the LDPC code. The third code contains a plurality of third code words, and when all of the third code words are used to correct errors, more errors are allowed to be corrected, compared to a case where the second code is partially corrected. Therefore, the third code is used when error correction to the second code has failed.

The third-code encoder 423 stores each of the third code words in the encoded-data buffer 460. The second-code encoder 422 according to the sixth embodiment performs encoding into the spatially-coupled LDPC code, as with the first embodiment.

Figure 41:
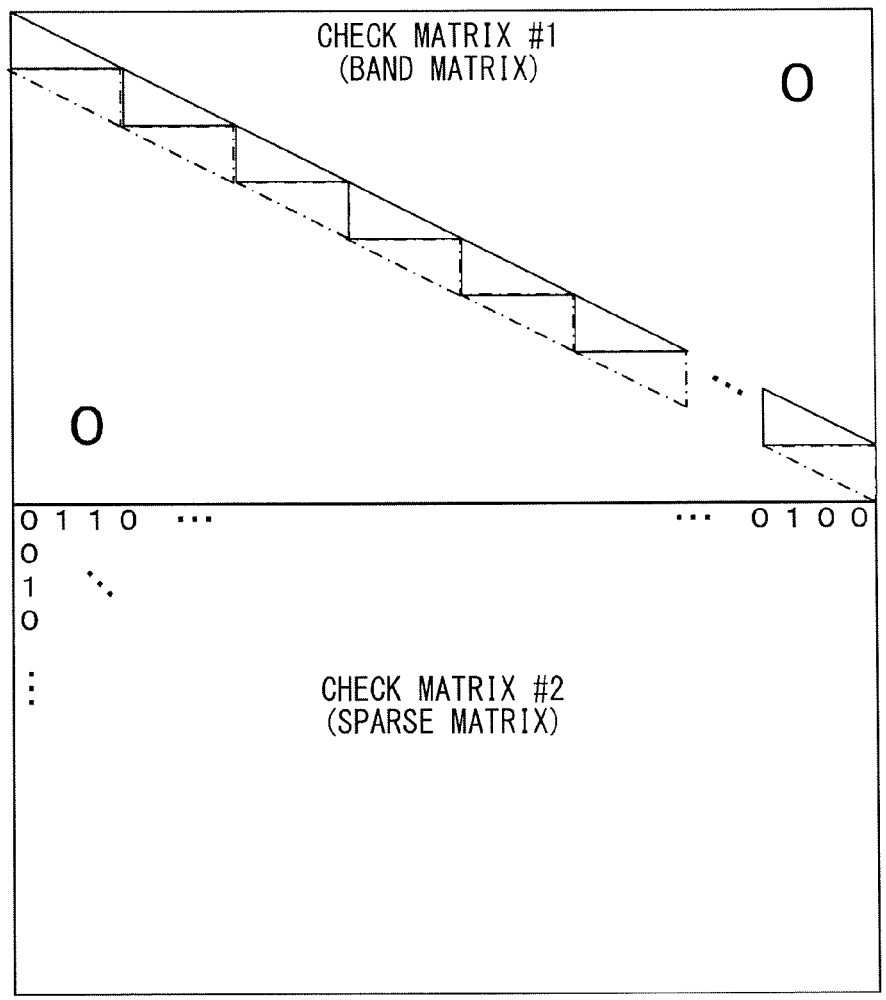
FIG. 41 is a diagram illustrating an example of a check matrix according to the sixth embodiment.

FIG. 41 is a diagram illustrating an example of a check matrix according to the sixth embodiment. The cheek matrix according to the sixth embodiment contains two partial matrices, i.e., check matrices #1 and #2. The check matrix #1 is a matrix used to correct an error in the spatially-coupled LDPC code, and is a band matrix similar to that according to the first embodiment. The check matrix #2 is a matrix used to correct an error in the LDPC code, and is a sparse matrix with an extremely small number of "1"s.

Figure 42:
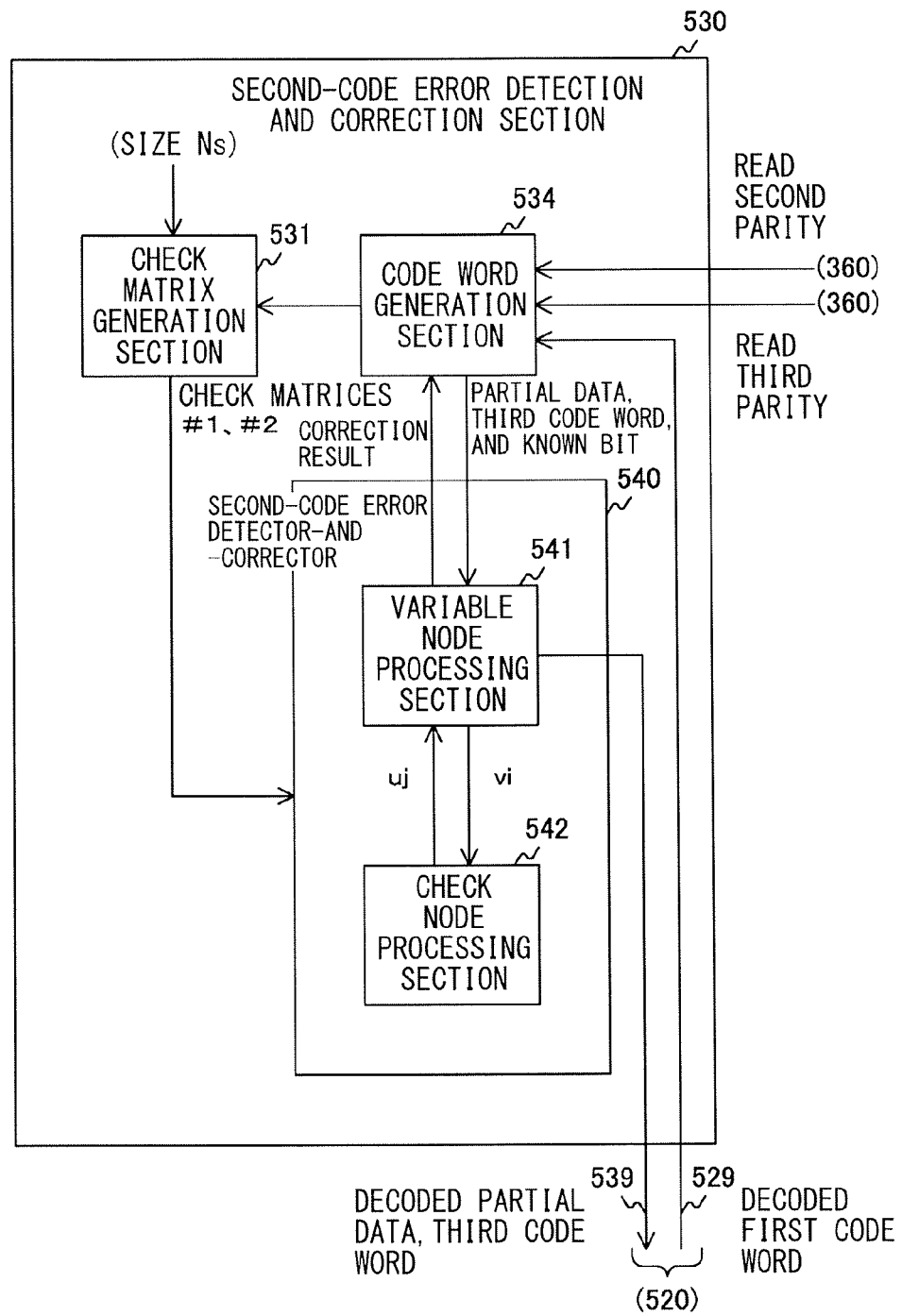
FIG. 42 is a block diagram illustrating a configuration example of a second-code error detection and correction section according to the sixth embodiment.

FIG. 42 is a block diagram illustrating a configuration example of the second-code error detection and correction section 530 according to the sixth embodiment. The second-code error detection and correction section 530 according to the sixth embodiment differs from that according to the first embodiment in that a code word generation section 534 is included, instead of the partial data generation section 532. The code word generation section 534 sequentially generates adjacent partial data and partial data in which an error is detected, and supplies the adjacent partial data and the partial data to the second-code error detector-and-corrector 540. The code word generation section 534 receives, from the second-code error detector-and-corrector 540, a correction result indicating whether or not error correction to the partial data in which the error is detected is successful. In a case where error correction to the second code word has failed, the code word generation section 534 generates all of the third code words, and supplies the third code words to the second-code error detector-and-corrector 540. As described above, since more errors are allowed to be corrected by correcting all of the third code words, compared to a case where the second code is partially corrected, error correction capability in an entire code is improved.

Thus, in the sixth embodiment, even if error correction to partial data has failed, the memory controller 300 is allowed to correct more errors by correcting errors in all of the third code words, compared to the case where the second code is partially corrected. Therefore, the error correction capability in the entire code is improved.

It is to be noted that the above-described embodiments of the present technology are merely examples for embodying the present technology, and there are correspondences between the features of the example embodiments of the present technology and the elements set forth in the appended claims. Similarly, there are correspondences between the elements set forth in the appended claims and the identically named features appearing in the example embodiments of the present technology. However, the present technology is not limited to the embodiments, and may be embodied by variously modifying the embodiments without departing from the scope of the present technology.

Moreover, the processing procedures described in the above-described embodiments may be regarded as a method having these procedures, or may be regarded as a program for causing a computer to execute these procedures or as a recording medium holding the program. As the recording medium, for example, a CD (Compact Disc), an MD (Mini Disc), a DVD (Digital Versatile Disk), a memory card, a Blu-ray Disc (registered trademark), or the like may be used.

It is to be noted that the present technology may have the following configurations.

(1) An error detection and correction unit including:
a first-code error detection section configured to detect whether or not each of a plurality of first code words in a second code word has an error, the second code word generated by encoding the plurality of first code words in chains and being a code word containing a plurality of partial data; and
a second-code error correction section configured to correct the error in one partial data containing the first code word in which the error is detected of the plurality of partial data in the second code word, based on adjacent partial data adjacent to the one partial data.

(2) The error detection and correction unit according to (1), in which
a data part common to partial data adjacent to each other of the plurality of partial data is a common code word, and
the second-code error correction section corrects the error in the one partial data containing the first code word in which the error is detected, based on the data part common to the one partial data and the adjacent partial data.

(3) The error detection and correction unit according to (1) or (2), in which the second-code error correction section corrects an error in the adjacent partial data, and when error correction to the adjacent partial data is successful, the second-code error correction section corrects the error detected by the first-code error detection section, based on the adjacent partial data.

(4) The error detection and correction unit according to (3), in which, when error correction to the adjacent partial data has failed, the second-code error correction section corrects an error in new adjacent partial data that is partial data adjacent to the adjacent partial data, and determines whether or not error correction to the new adjacent partial data is successful.

(5) The error detection and correction unit according to (3) or (4), in which, when an error in the first code word contained in the adjacent partial data is not detected, the second-code error correction section corrects the error detected by the first-code error detection section, based on the adjacent partial data, and when an error in the first code word contained in the adjacent partial data is detected, the second-code error correction section determines whether or not an error is detected in the first code word contained in new adjacent partial data that is partial data adjacent to the adjacent partial data.

(6) The error detection and correction unit according to (3), in which the second-code error correction section corrects an error in the second code word when error correction to the adjacent partial data has failed.

(7) The error detection and correction unit according to any one of (1) to (6), in which the second-code error correction section determines whether or not correction to the error that is performed, based on the adjacent partial data, is successful, and when the correction has failed, the second-code error correction section corrects the error, based on third code words each containing the first code word.

(8) The error detection and correction unit according to (1), in which
the second code word is a convolution code word, and
the second-code error correction section corrects the error, based on a result of a convolution operation performed on the adjacent partial data.

(9) The error detection and correction unit according to (8), in which the second code word is a turbo code word.

(10) The error detection and correction unit according to (1), in which the second-code error correction section corrects the error in a combination of the one partial data containing the first code word in which the error is detected and the adjacent partial data as one decoding unit.

(11) The error detection and correction unit according to any one of (1) to (10), in which
each of the plurality of partial data contains a second parity used to correct an error in each of the partial data and a first parity used to correct an error in the second parity, and
the second-code error correction section corrects the error in the second parity with use of the first parity, and corrects the error in the one partial data with use of the corrected second parity.

(12) The error detection and correction unit according to any one of (1) to (11), in which each of the plurality of partial data contains two or more of the plurality of first code words.

(13) An information processor including:
a second-code encoding section configured to generate a second code word by encoding a plurality of first code words in chains, the second code word being a code word containing a plurality of partial data;
a first-code error detection section configured to detect whether or not each of the first code words in the second code word has an error; and
a second-code error correction section configured to correct the error in one partial data containing the first code word in which the error is detected of the plurality of partial data in the second code word, based on adjacent partial data adjacent to the one partial data.

(14) An error detection and correction method including:
detecting whether or not each of a plurality of first code words in a second code word has an error, the second code word generated by encoding the plurality of first code words in chains and being a code word containing a plurality of partial data; and
correcting the error in one partial data containing the first code word in which the error is detected of the plurality of partial data in the second code word, based on adjacent partial data adjacent to the one partial data.

(15) A non-transitory tangible recording medium having a program embodied therein, the computer-readable program allowing, when executed by a computer, the computer to implement a method, the method including:
detecting whether or not each of a plurality of first code words in a second code word has an error, the second code word generated by encoding the plurality of first code words in chains and being a code word containing a plurality of partial data; and correcting the error in one partial data containing the first code word in which the error is detected of the plurality of partial data in the second code word, based on adjacent partial data adjacent to the one partial data.

It should be understood by those skilled in the art that various modifications, combinations, sub-combinations, and alterations may occur depending on design requirements and other factors insofar as they are within the scope of the appended claims or the equivalents thereof.

What is claimed is:

1. An error detection and correction unit comprising:
    a first-code error detection section configured to detect whether or not each of a plurality of first code words in a second code word has an error, wherein the second code word is generated by encoding the plurality of first code words in chains and is a code word containing a plurality of partial data; and
    a second-code error correction section configured to correct an error in one partial data containing the first code word in which the error is detected from among the plurality of partial data in the second code word, wherein the correction is based on adjacent partial data adjacent to the one partial data.

2. The error detection and correction unit according to claim 1, wherein
    a data part common to partial data adjacent to each other of the plurality of partial data is a common code word, and
    the second-code error correction section corrects the error in the one partial data containing the first code word in which the error is detected, based on the data part common to the one partial data and the adjacent partial data.

3. The error detection and correction unit according to claim 1, wherein the second-code error correction section corrects an error in the adjacent partial data, and when error correction to the adjacent partial data is successful, the second-code error correction section corrects the error detected by the first-code error detection section, based on the adjacent partial data.

4. The error detection and correction unit according to claim 3, wherein, when error correction to the adjacent partial data has failed, the second-code error correction section corrects an error in new adjacent partial data that is partial data adjacent to the adjacent partial data, and determines whether or not error correction to the new adjacent partial data is successful.

5. The error detection and correction unit according to claim 3, wherein, when an error in the first code word contained in the adjacent partial data is not detected, the second-code error correction section corrects the error detected by the first-code error detection section, based on the adjacent partial data, and when an error in the first code word contained in the adjacent partial data is detected, the second-code error correction section determines whether or not an error is detected in the first code word contained in new adjacent partial data that is partial data adjacent to the adjacent partial data.

6. The error detection and correction unit according to claim 3, wherein the second-code error correction section corrects an error in the second code word when error correction to the adjacent partial data has failed.

7. The error detection and correction unit according to claim 1, wherein the second-code error correction section determines whether or not correction to the error that is performed, based on the adjacent partial data, is successful, and when the correction has failed, the second-code error correction section corrects the error, based on third code words each containing the first code word.

8. The error detection and correction unit according to claim 1,
    wherein the second code word is a convolution code word, and
    the second-code error correction section corrects the error, based on a result of a convolution operation performed on the adjacent partial data.

9. The error detection and correction unit according to claim 8, wherein the second code word is a turbo code word.

10. The error detection and correction unit according to claim 1, wherein the second-code error correction section corrects the error in a combination of the one partial data containing the first code word in which the error is detected and the adjacent partial data as one decoding unit.

11. The error detection and correction unit according to claim 1, wherein
    each of the plurality of partial data contains a second parity used to correct an error in each of the partial data and a first parity used to correct an error in the second parity, and
    the second-code error correction section corrects the error in the second parity with use of the first parity, and corrects the error in the one partial data with use of the corrected second parity.

12. The error detection and correction unit according to claim 1, wherein each of the plurality of partial data contains two or more of the plurality of first code words.

13. An information processor comprising:
    a second-code encoding section configured to generate a second code word by encoding a plurality of first code words in chains, the second code word being a code word containing a plurality of partial data;
    a first-code error detection section configured to detect whether or not each of the first code words in the second code word has an error; and
    a second-code error correction section configured to correct an error in one partial data containing the first code word in which the error is detected from among the plurality of partial data in the second code word, wherein the correction is based on adjacent partial data adjacent to the one partial data.

14. An error detection and correction method comprising:
    detecting, by one or more processors, whether or not each of a plurality of first code words in a second code word has an error, wherein the second code word is generated by encoding the plurality of first code words in chains and is a code word containing a plurality of partial data; and
    correcting, by one or more processors, an error in one partial data containing the first code word in which the error is detected from among the plurality of partial data in the second code word, wherein the correction is based on adjacent partial data adjacent to the one partial data.

15. A non-transitory computer-readable storage medium having stored thereon a set of computer-executable instructions for causing a computer to perform a method comprising:
    detecting, by one or more processors, whether or not each of a plurality of first code words in a second code word has an error, wherein the second code word is generated by encoding the plurality of first code words in chains and is a code word containing a plurality of partial data; and
    correcting, by one or more processors, an error in one partial data containing the first code word in which the error is detected from among the plurality of partial data in the second code word, wherein the correction is based on adjacent partial data adjacent to the one partial data.

* * * * *